(12) United States Patent
Yanagawa et al.

(10) Patent No.: US 8,018,803 B2
(45) Date of Patent: Sep. 13, 2011

(54) INFORMATION RECORDING APPARATUS AND METHOD AND COMPUTER PROGRAM

(75) Inventors: Naoharu Yanagawa, Saitama (JP); Akira Shirota, Saitama (JP)

(73) Assignee: Pioneer Corporation, Tokyo (JP)

( * ) Notice: Subject to any disclaimer, the term of this patent is extended or adjusted under 35 U.S.C. 154(b) by 803 days.

(21) Appl. No.: 12/064,823

(22) PCT Filed: Aug. 16, 2006

(86) PCT No.: PCT/JP2006/316101
§ 371 (c)(1),
(2), (4) Date: Apr. 14, 2008

(87) PCT Pub. No.: WO2007/026543
PCT Pub. Date: Mar. 8, 2007

(65) Prior Publication Data
US 2009/0116350 A1    May 7, 2009

(30) Foreign Application Priority Data
Aug. 30, 2005 (JP) .................................. 2005-249419

(51) Int. Cl.
*G11B 5/00* (2006.01)
*G11B 7/12* (2006.01)

(52) U.S. Cl. ...................................................... 369/47.5

(58) Field of Classification Search .................. 369/47.5, 369/47.51, 47.53, 53.34, 53.27
See application file for complete search history.

(56) References Cited

U.S. PATENT DOCUMENTS
2005/0237884 A1*  10/2005  Yanagawa ................. 369/47.53

FOREIGN PATENT DOCUMENTS

| | | |
|---|---|---|
| JP | 07-220280 | 8/1995 |
| JP | 2000-149259 | 5/2000 |
| JP | 2000-251254 | 9/2000 |
| JP | 2002-123941 | 4/2002 |
| JP | 2002-352517 | 12/2002 |
| JP | 2003-59048 | 2/2003 |
| WO | 2004/019324 | 3/2004 |

\* cited by examiner

*Primary Examiner* — Joseph Haley
*Assistant Examiner* — Nicholas Lee
(74) *Attorney, Agent, or Firm* — Young & Thompson

(57) ABSTRACT

An information recording apparatus (1) is provided with: a recording device (501) for recording record information onto an information recording medium (100) by irradiating laser light (LB) with a predetermined power; an adding device (550) for adding weight to at least one of a plurality of reproduction features associated with the record information; and a controlling device (504, 550) for controlling the recording device to record the record information with a power in which the at least one reproduction feature with the weight added satisfies a predetermined first reference.

21 Claims, 13 Drawing Sheets

[FIG. 1]
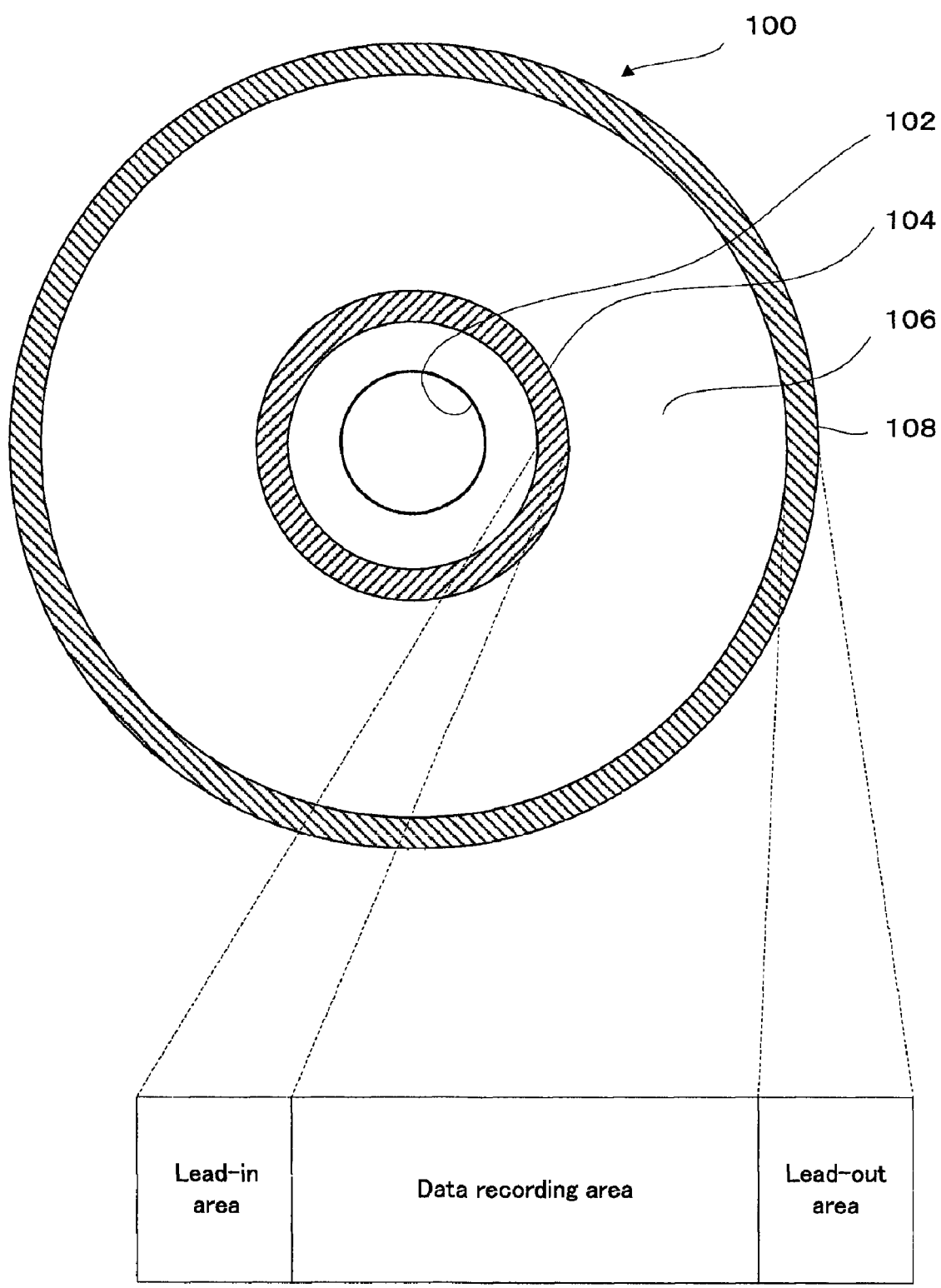

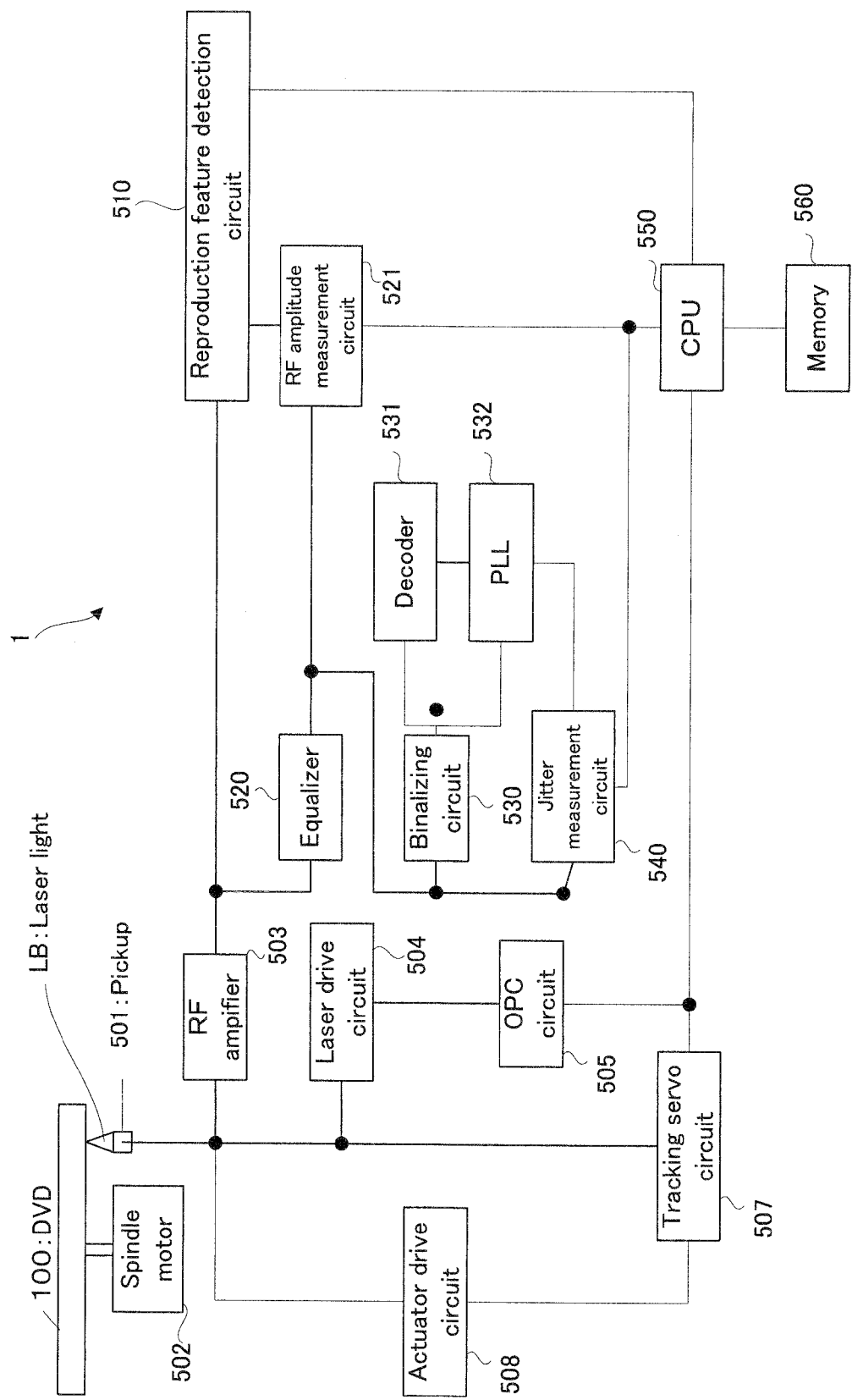
[FIG. 2]

[FIG. 3]
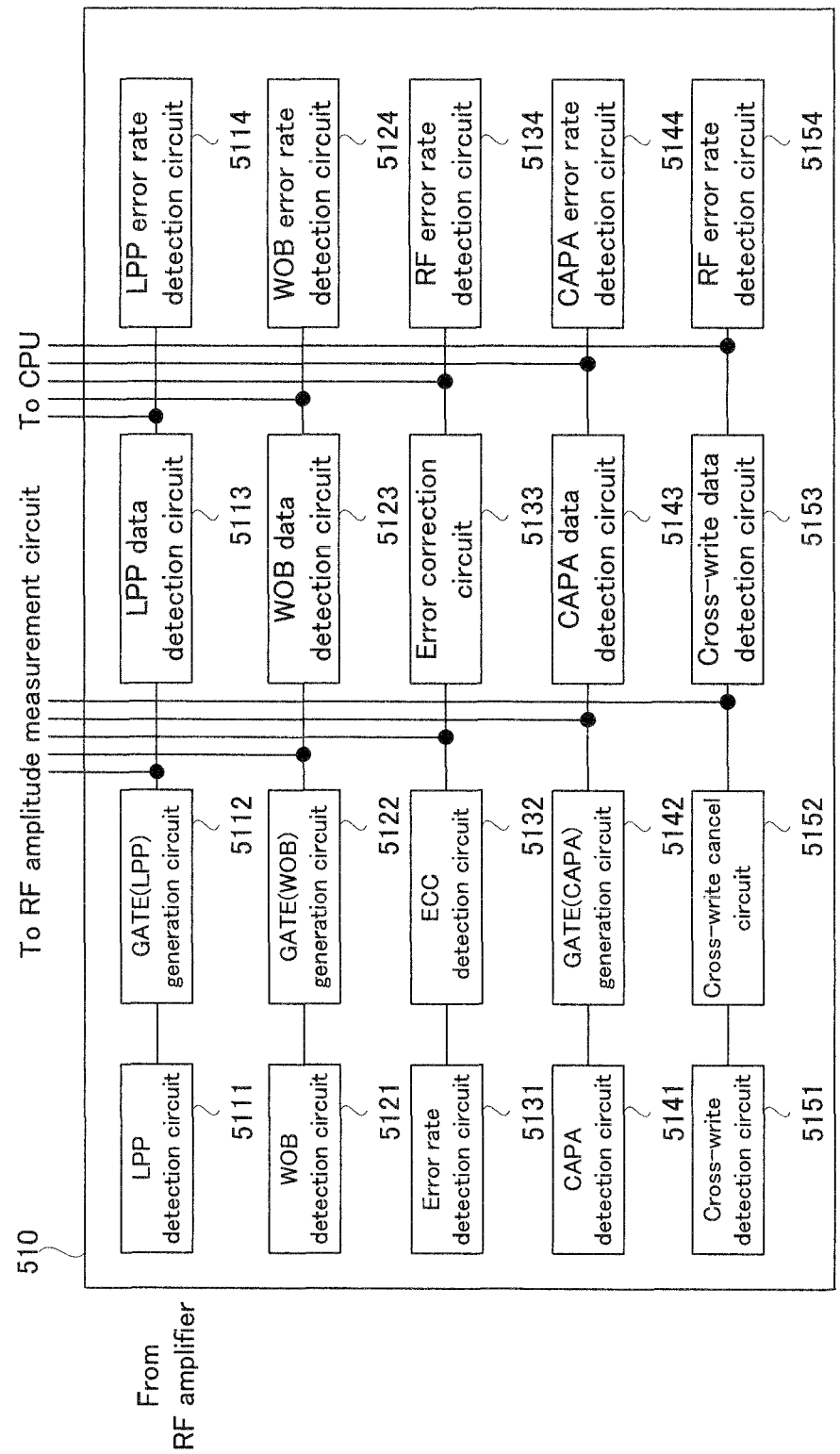

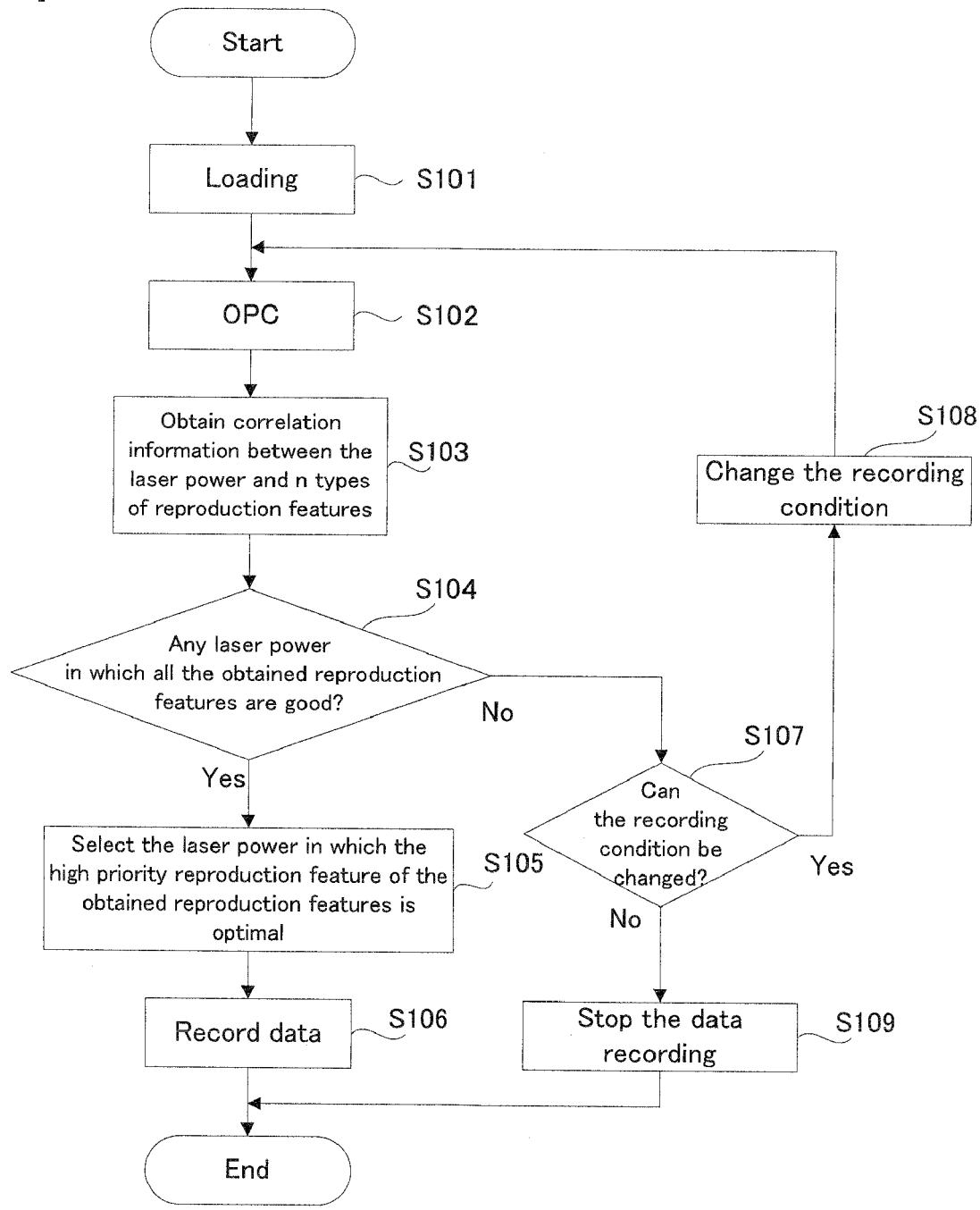
[FIG. 4]

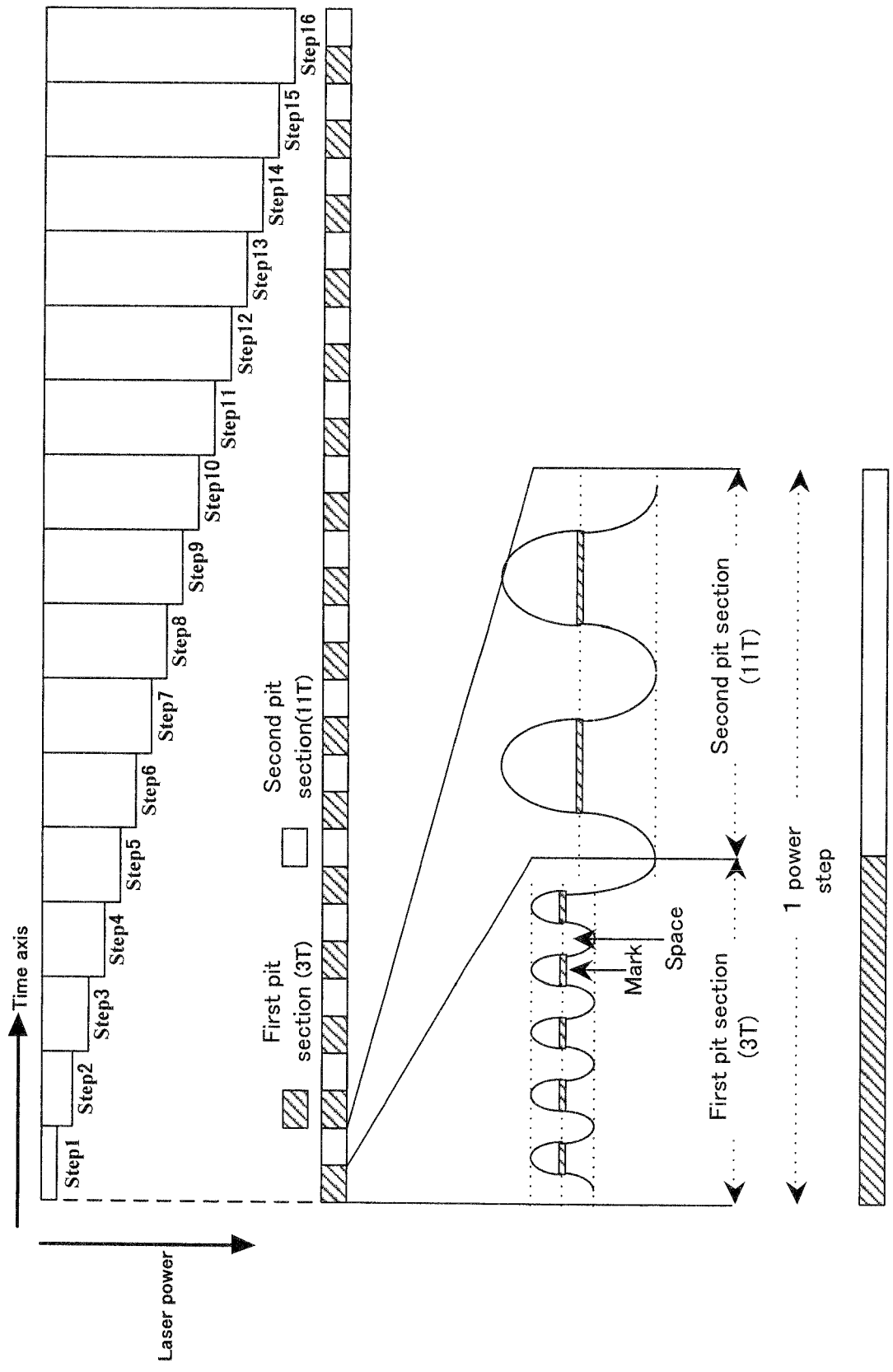
[FIG. 5]

[FIG. 6]
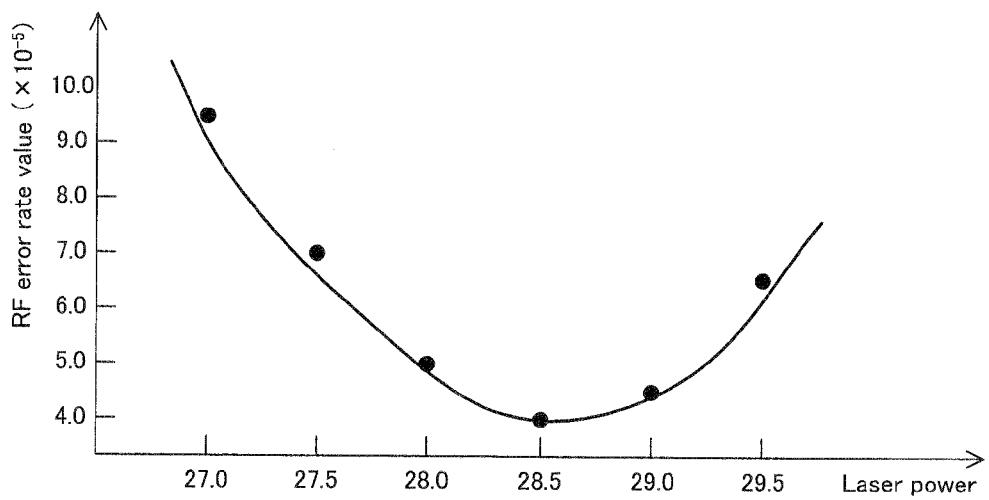
(a)
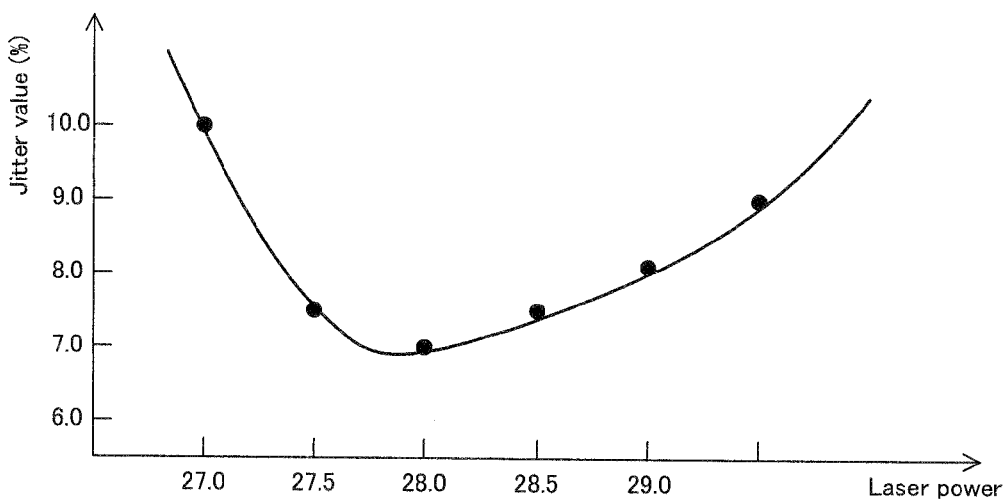
(b)
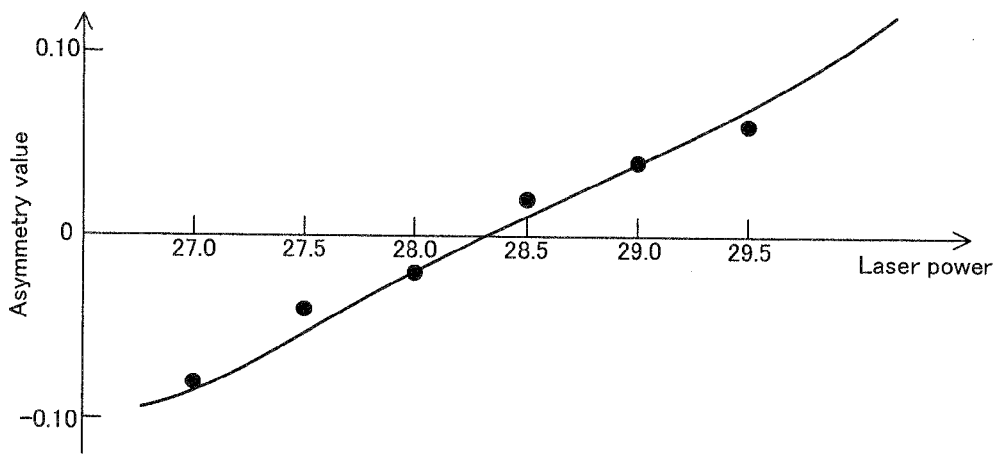
(c)

[FIG. 7]
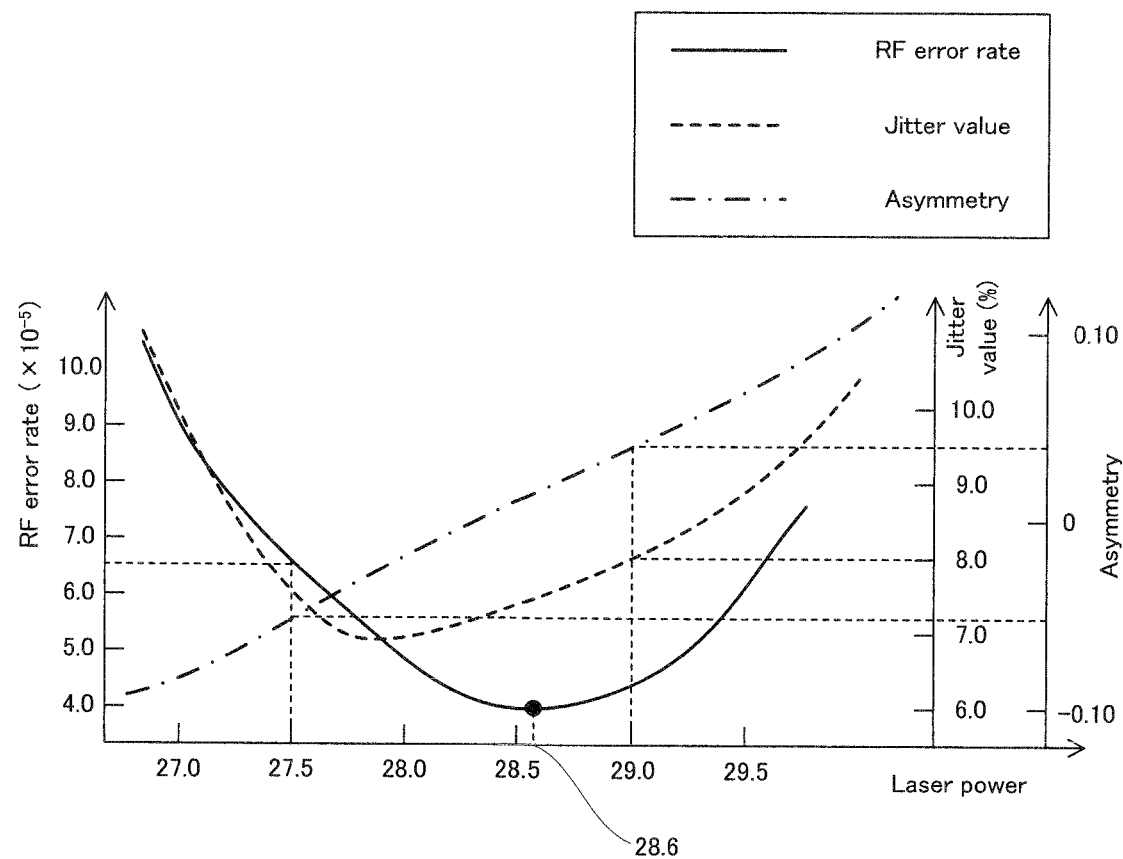

[FIG. 8]
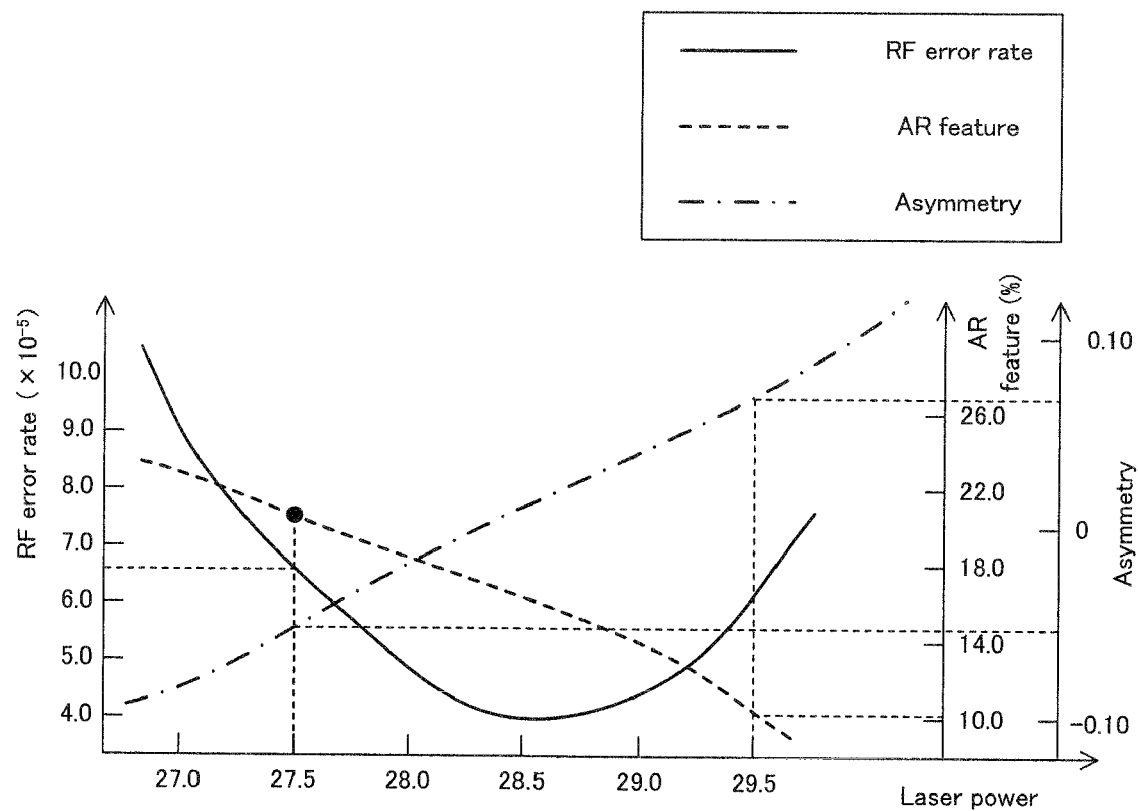

[FIG. 9]
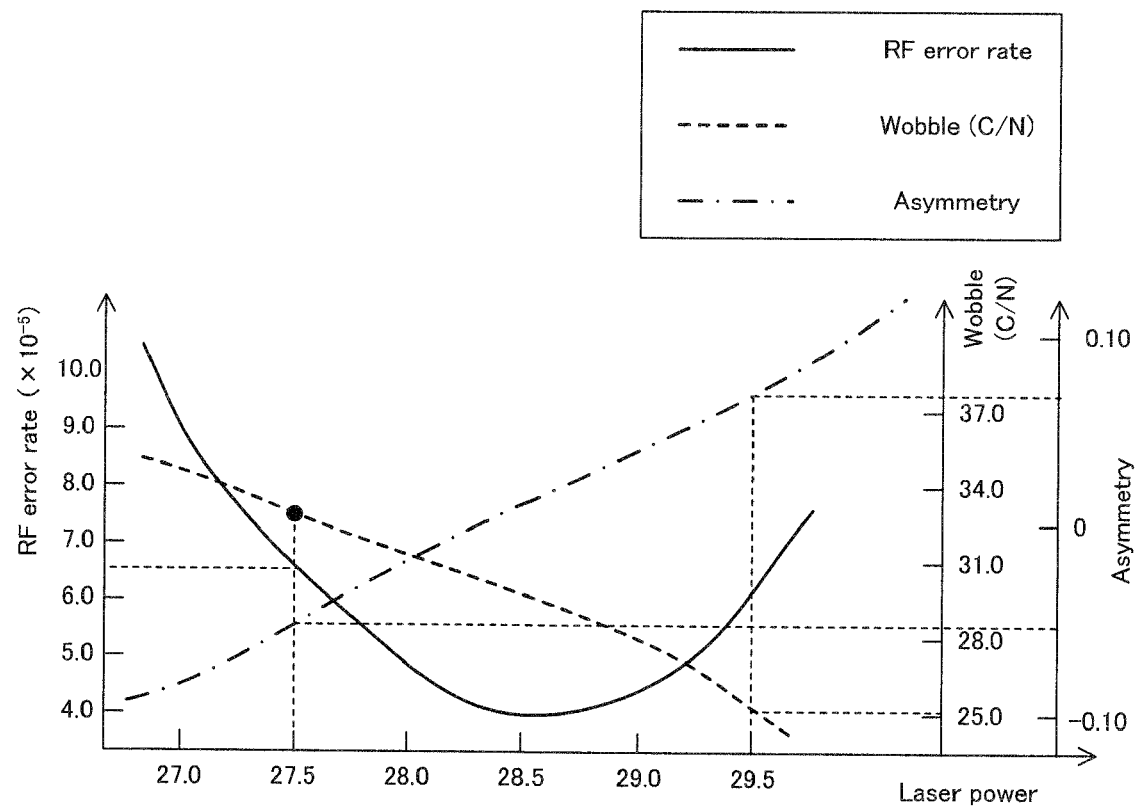

[FIG. 10]
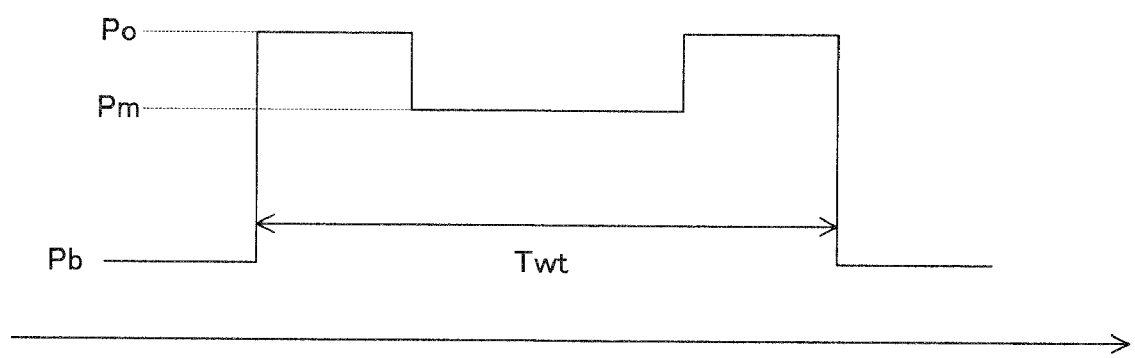
(a)
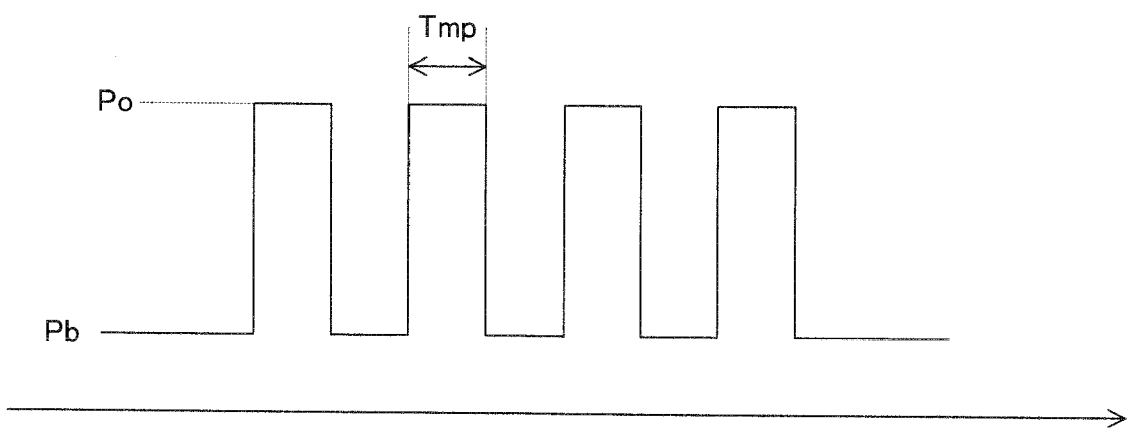
(b)

[FIG. 11]

| Laser power | Po/Pm | AR feature (%) |
|---|---|---|
| 16.0mW | 1.55 | 19 |
| | 1.65 | 22 |

(a)

| Recording speed | Jitter value (%) |
|---|---|
| 8-time speed | 8.5 |
| 6-time speed | 7.5 |

(b)

| Laser power | Recording speed [m/s] | Jitter value (%) |
|---|---|---|
| 21.6mW | 20.0 | 8.1 |
| | 20.9 | 6.9 |

(c)

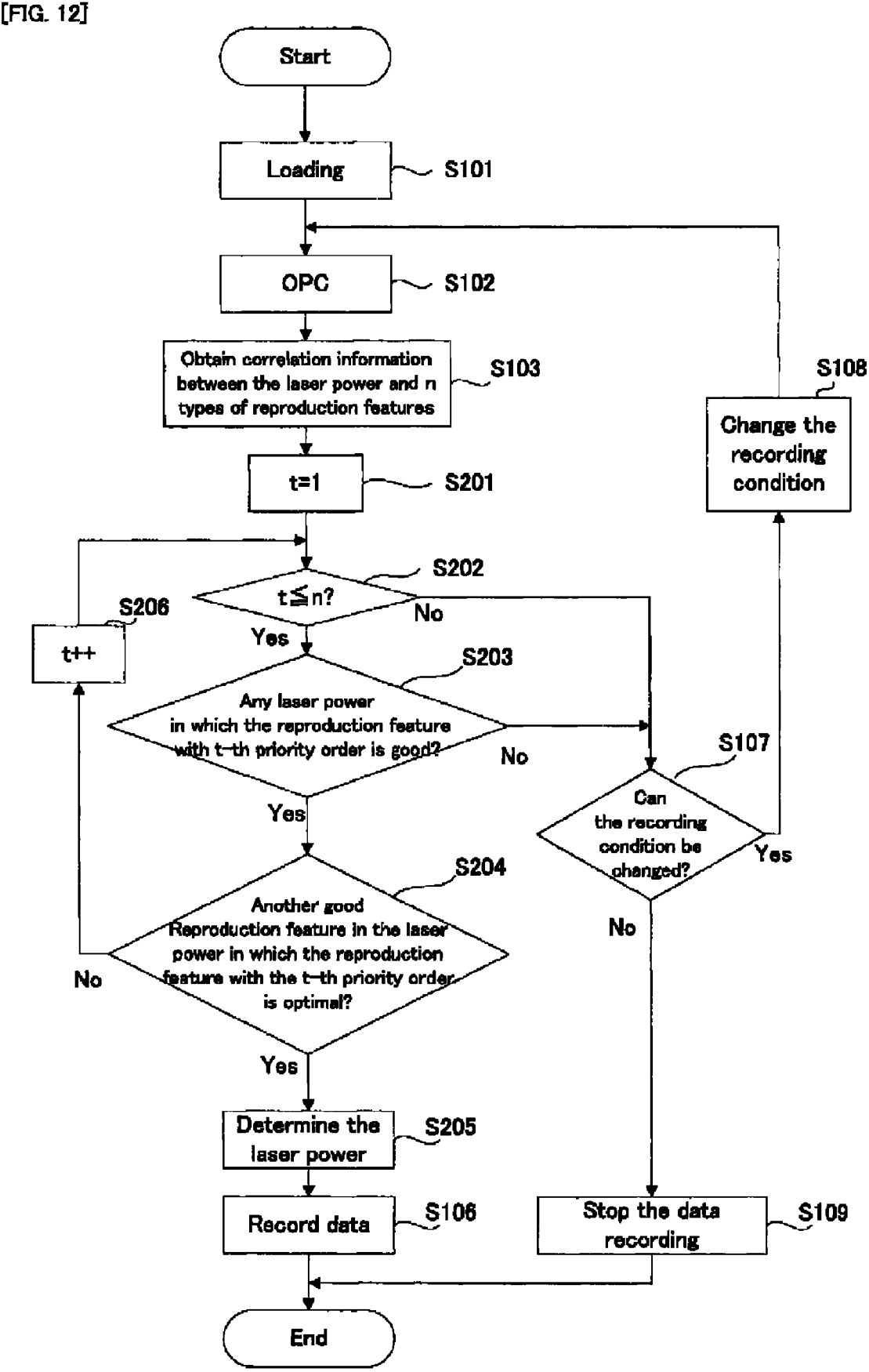
[FIG. 12]

[FIG. 13]

| Reproduction feature | Priority order |
|---|---|
| RF error rate | 1 |
| Jitter value | 2 |
| Asymmetry | 3 |

(a)

| Reproduction feature | Priority order |
|---|---|
| AR feature | 1 |
| RF error rate | 2 |
| Asymmetry | 3 |

(b)

| Reproduction feature | Priority order |
|---|---|
| Wobble (C/N) | 1 |
| RF error rate | 2 |
| Asymmetry | 3 |

(c)

INFORMATION RECORDING APPARATUS AND METHOD AND COMPUTER PROGRAM

TECHNICAL FIELD

The present invention relates to an information recording apparatus and method, such as a DVD recorder, and a computer program which makes a computer function as the information recording apparatus.

BACKGROUND ART

For example, in an information recording apparatus which performs recording on an information recording medium, such as an optical disc, an optimum power is set by an OPC (Optimum Power Control) process in accordance with the type of the optical disc, the type of an information recording/reproducing apparatus, a recording speed, or the like. That is, power calibration is performed. By this, an appropriate recording operation can be realized. For example, when the optical disc is inserted and a writing command is inputted, test-writing data is recorded into a power calibration area, with a light intensity being changed sequentially and step by step. A so-called test-writing process is performed. After that, the test-writing data recorded in this manner is reproduced, and the reproduction result is judged on the basis of a predetermined evaluation standard, to thereby set the optimum power. As the evaluation standard, for example, there are an evaluation method based on asymmetry as disclosed in a patent document 1, an evaluation method based on a jitter value as disclosed in a patent document 2, and the like.

On the other hand, the recording speed for recording data onto the information recording medium increases with the advancement of technology. For example, a 2-time recording speed, a 4-time recording speed, an 8-time recording speed, a 16-time recording speed, and the like are realized.

Patent document 1: Japanese Patent Application Laid Open NO. 2003-59048
Patent document 2: Japanese Patent Application Laid Open NO. 2002-352517

DISCLOSURE OF INVENTION

Subject to be Solved by the Invention

However, since the rotational speed of the optical disc also increases along with the increase of the data recording speed, the irradiation condition of laser light is different from that in the case of the relatively slow recording speed. Thus, the relatively fast recording speed causes such a technical problem that the data cannot be appropriately recorded onto the optical disc even if the power calibration is performed by performing the conventional OPC as described above.

It is therefore an object of the present invention to provide an information recording apparatus and method, which enable data to be recorded without deteriorating the reproduction features of the data recorded on the information recording medium, such as an optical disc.

Means for Solving the Subject (Information Recording Apparatus)
The above object of the present invention can be achieved by an information recording apparatus provided with: a recording device for recording record information onto an information recording medium by irradiating laser with a predetermined power; an adding device for adding weight to at least one of a plurality of reproduction features associated with the record information; and a controlling device for controlling the recording device to record the record information with a power in which the at least one reproduction feature with the weight added satisfies a predetermined first reference.

According to the information recording apparatus of the present invention, the record information can be recorded by irradiating the information recording medium with the laser light, by the operation of the recording device.

In particular, in the present invention, the weight is added to at least one of the plurality of reproduction features (e.g. an asymmetry value, an error rate value, a jitter value, and the like, described later) associated with the record information, by the operation of the adding device. Then, the recording device is controlled (i.e. the power is controlled) to record the record information with the power in which the at least one reproduction feature with the weight added satisfies the predetermined first reference, by the operation of the controlling device. In other words, at least the preferentially considered reproduction feature to control the recording device is selected from the plurality of reproduction features. The selected reproduction feature corresponds to the "reproduction feature with the weight added" in the present invention. The weight addition may be performed in each time of the recording operation, or before the start of the recording operation, or before factory shipment. Moreover, the "predetermined first reference" indicates a reference which can realize a state that the reproduction feature in reproducing the record information recorded with a certain power is optimal, a state that it is regarded to be substantially optimal, or a state that it is preferable. That is, preferable reproduction is ensured for the record information in which the reproduction feature satisfies the predetermined first reference. The predetermined first reference may be determined in advance, or may be set in accordance with the recording operation, as occasion demands.

By this, in the information recording apparatus on which the laser light with a variable power is irradiated, it is possible to record the record information with a preferable power. Therefore, according to the information recording apparatus of the present invention, it is possible to record the recording information which can realize the preferable reproduction features.

Incidentally, in the conventional information recording apparatus, the reproduction features of the record information to be recorded depend on an optimum power detected by OPC (Optimum Power Control) or the like. In particular, in the OPC or the like, the optimum power is detected such that an asymmetry value, a jitter value, or the like as the reproduction feature is uniformly preferable. However, particularly in high-speed recording, even if the recording is performed by using the laser light with the power in which the asymmetry value or the jitter value of reproduced information is good, there is a possibility that the other reproduction features (e.g. an error rate value, a cross-write value, or the like) become inferior. However, in the information recording apparatus of the present invention, instead of controlling the recording device such that a certain reproduction feature is uniformly (in other words, fixedly) preferable, the reproduction feature emphasized in controlling the recording device is selected, and the recording device is controlled such that the selected reproduction feature is preferable. Therefore, as compared to the information recording apparatus on which the recording device is controlled such that a certain reproduction feature is uniformly preferable, it is possible to record the record information with a more preferable power. As a result, it is possible to record the record information which can realize the more preferable reproduction features.

Consequently, according to the information recording apparatus of the present invention, it is possible to record the record information by using the laser light with a proper power. Along with that, it is possible to further improve the reproduction features of the record information to be recorded.

In one aspect of the information recording apparatus of the present invention, the controlling device controls the recording device to record the record information with a power in which the at least one reproduction feature with the weight added satisfies the predetermined first reference and in which another reproduction feature other than the at least one reproduction feature with the weight added out of the plurality of reproduction features satisfies a second reference, which is milder than the first reference.

According to this aspect, the recording device can be controlled by fully considering the improvement of not only the reproduction feature with the weight added but also the other reproduction features. Therefore, it is possible to record the record information onto the information recording medium, more preferably.

Incidentally, the "second reference" is a reference which is milder than the first reference and which can realize a state that the reproduction feature in reproducing the record information recorded with a certain power does not cause a trouble or a state that it causes a preferable condition. That is, there is not any particular disadvantage in the reproduction of the record information in which the reproduction feature satisfies the second reference. More specifically, for example, the second reference corresponds to a reference which requires that the reproduction feature is included in an allowable range of the reproduction feature determined by a standard. The first reference corresponds to a reference which requires that the reproduction feature is included in a more optimal range in the allowable range.

In another aspect of the information recording apparatus of the present invention, the adding device adds a priority order to each of the plurality of reproduction features, and the controlling device controls the recording device to record the record information with a power in which a first reproduction feature with the relatively high priority order out of the plurality of reproduction features satisfies the first reference.

According to this aspect, the priority order is added uniquely to each of the plurality of reproduction features, for example, in accordance with the recordings state (or recording condition) of the information recording apparatus. Then, the record information is recorded with the power in which the high-priority first reproduction feature preferentially satisfies the first reference. Therefore, even if it is necessary to consider the plurality of reproduction features in controlling the recording device, the recording device can be preferably controlled with reference to the priority order.

Incidentally, the reproduction feature with the relatively high priority order, required to satisfy the first reference in controlling the power, corresponds to the "at least one reproduction feature with the weight added" described above.

In an aspect of the information recording apparatus in which the priority order is added, as described above, the controlling device may control the recording device to record the record information with a power in which the first reproduction feature satisfies the first reference and in which another reproduction feature other than the first reproduction feature out of the plurality of reproduction features satisfies a second reference, which is milder than the first reference.

By virtue of such construction, the recording device can be controlled by fully considering the improvement of not only the high-priority reproduction feature but also another reproduction feature with the lower priority order than the first reproduction feature. Therefore, it is possible to record the record information, preferably, by using the information recording medium.

In an aspect of the information recording apparatus in which the priority order is added, as described above, if the controlling device cannot control the recording device to record the record information with the power in which the another reproduction feature satisfies the second reference, the controlling device may control the recording device to record the record information with a power in which a second reproduction feature, which is prioritized next to the first reproduction feature, satisfies the first reference and in which another reproduction feature other than the second reproduction feature out of the plurality of reproduction features satisfies the second reference.

By virtue of such construction, the recording device is controlled while the second reproduction feature having the lower priority order than that of the first reproduction feature is regarded as the new first reproduction feature. Therefore, the recording device can be preferably controlled such that the high-priority reproduction feature preferentially satisfies the first reference.

In another aspect of the information recording apparatus of the present invention, the adding device adds the weight in accordance with whether or not a margin in each of the plurality of reproduction features is small with respect to an allowable range determined for each of the plurality of reproduction features due to a standard of the information recording medium.

According to this aspect, for example, the weight is added to the reproduction feature with a small margin with respect to the allowable range. In other words, the weight is added to the reproduction feature which is included in the allowable range but close to its upper limit or lower limit. Therefore, since the recording device is controlled such that the reproduction feature satisfies the first reference by the operation of the controlling device, it is possible to preferably improve the reproduction features of the record information.

In another aspect of the information recording apparatus of the present invention, the adding device adds the weight in accordance with reproduction compatibility of the information recording medium in a plurality of types of information reproducing apparatuses.

According to this aspect, the weight is added to a certain reproduction feature so as to ensure the reproduction compatibility, to thereby control the recording device. Therefore, it is possible to preferably improve the reproduction features of the record information so as to ensure the reproduction compatibility.

In another aspect of the information recording apparatus of the present invention, the adding device adds the weight in accordance with a performance of additional recording in the information recording medium.

According to this aspect, the weight is added to a certain reproduction feature so as to ensure the performance of additional recording, to thereby control the recording device. Therefore, it is possible to preferably improve the reproduction features of the record information so as to ensure the performance of additional recording.

In another aspect of the information recording apparatus of the present invention, the adding device adds the weight in accordance with a random access performance in the information recording medium.

According to this aspect, the weight is added to a certain reproduction feature so as to ensure the random access performance, to thereby control the recording device. Therefore, it is possible to preferably improve the reproduction features of the record information so as to ensure the random access performance.

In another aspect of the information recording apparatus of the present invention, the adding device adds the weight in accordance with a recording speed, which indicates a speed at which the record information is recorded.

According to this aspect, it is possible to preferably improve the reproduction features of the record information in accordance with the recording speed.

In another aspect of the information recording apparatus of the present invention, the information recording medium is provided with a plurality of recording tracks on which the record information is recorded, and the adding device adds the weight in accordance with a cross-write value which indicates an influence of the laser light on another recording track substantially adjacent to one recording track if the one recording track of the plurality of recording tracks is irradiated with the laser light.

According to this aspect, the weight is added to a certain reproduction feature so as to reduce the cross-write value or make it zero, to thereby control the recording device. Therefore, it is possible to preferably improve the reproduction features of the record information so as to reduce the cross-write value or make it zero.

In another aspect of the information recording apparatus of the present invention, it is further provided with a modifying device for modifying a recording condition in recording the record information, if the record information cannot be recorded with the power in which the at least one reproduction feature with the weight added satisfies the first reference.

According to this aspect, the value of the at least one reproduction feature with the weight added is changed by modifying the recording condition. As a result, the record information can be recorded with the power in which the at least one reproduction feature with the weight added satisfies the first reference.

In an aspect of the information recording apparatus provided with the modifying device, as described above, the laser light may include a top pulse with a first amplitude and a middle pulse with a second amplitude, which is smaller than the first amplitude, and the modifying device may modify at least the second amplitude, as the recording condition.

By virtue of such construction, it is possible to change the value of the at least one reproduction feature with the weight added, by modifying the second amplitude. As a result, the record information can be recorded with the power in which the at least one reproduction feature with the weight added satisfies the first reference.

In an aspect of the information recording apparatus provided with the modifying device, as described above, the laser light may include a plurality of pulses, and the modifying device may modify a pulse width of at least one of the plurality of pulses, as the recording condition.

By virtue of such construction, it is possible to change the value of the at least one reproduction feature with the weight added, by modifying the pulse width. As a result, the record information can be recorded with the power in which the at least one reproduction feature with the weight added satisfies the first reference.

In an aspect of the information recording apparatus provided with the modifying device, as described above, the modifying device may modify at least one of a recording linear velocity and a recording density, as the recording condition.

By virtue of such construction, it is possible to change the value of the at least one reproduction feature with the weight added, by modifying at least one of the recording linear velocity and the recording density. As a result, the record information can be recorded with the power in which the at least one reproduction feature with the weight added satisfies the first reference.

In another aspect of the information recording apparatus of the present invention, the plurality of reproduction features include at least one of a jitter value, an asymmetry value, an error rate value, a cross-write value, a LPP signal level value, a wobble signal level value, and a CAPA signal level value.

According to this aspect, it is possible to preferably improve the reproduction features.

In another aspect of the information recording apparatus of the present invention, the recording device records the record information at a recording speed of N-time speed or more (wherein N is an integer of 2 or more), compared to a reference recording speed in recording the record information.

According to this aspect, it is possible to effectively prevent the spread of the plurality of reproduction features, which is a problem particularly in the high-speed recording (i.e. in the recording at a 4-time recording speed or more, compared to a one-time recording speed, which is the reference recording speed). Therefore, even in the high-speed recording, it is possible to improve the reproduction features of the record information (in particular, the first reproduction feature of pre-information).

In other words, in the information recording apparatus of the present invention, the asymmetry or the jitter value, which is an evaluation reference for detecting the optimum power in the OPC conventionally, is not merely changed to the other reproduction features. That is, according to the present invention, it has a new effect in focusing on preferably preventing the spread of the plurality of reproduction features, which is a problem particularly in the high-speed recording, while the asymmetry or the jitter value is included in the allowable range. Moreover it has a specific effect which cannot be realized by the conventional OPC and in which it is possible to effectively avoid the spread of the plurality of reproduction features in the high-speed recording (i.e. it is possible to effectively improve each of the plurality of reproduction features) which cannot be solved by the conventional OPC.

In another aspect of the information recording apparatus of the present invention, the controlling device controls the recording device to record the record information with the power in which the at least one reproduction feature with the weight added satisfies the predetermined first reference, on the basis of correlation information which indicates a correlation between the power and the at least one reproduction feature with the weight added.

According to this aspect, the recording device can be controlled appropriately, on the basis of the correlation information. Therefore, it is possible to improve the reproduction features of the record information which is recorded onto the information recording medium.

In another aspect of the information recording apparatus of the present invention, the controlling device controls the recording device to record the record information with the power in which the at least one reproduction feature with the weight added satisfies the predetermined first reference, on the basis of correlation information which indicates a correlation between the power and each of the plurality of reproduction features.

According to this aspect, the recording device can be controlled appropriately, on the basis of the correlation information. Therefore, it is possible to improve the reproduction features of the record information which is recorded onto the information recording medium.

In an aspect of the information recording apparatus in which the recording device is controlled by using the correlation information, as described above, it may be further provided with a generating device for generating the correlation information by controlling the recording device to record test information for test-writing onto the information recording medium while changing the power and to reproduce the test information.

By virtue of such construction, for example, it is possible to preferably generate the correlation information, by recording the test information while changing the power, step by step or continuously, as in the OPC described later. Thus, the recording device can be controlled appropriately, on the basis of the generated correlation information. In particular, since the recording device is controlled on the basis of the correlation between the actually recorded record information and the reproduction feature, it is possible to preferably control the recording device, regardless of the variation in each information recording apparatus, the variation in each information recording medium, or the like.

In an aspect of the information recording apparatus provided with the generating device, as described above, the recording device may record the generated correlation information onto the information recording medium.

By virtue of such construction, the once generated correlation information can be used continuously after the generation. Therefore, it is possible to save the load of generating the correlation information again when the recording device is controlled again.

In particular, the recording is performed on the information recording medium. Thus, even if the information recording medium is ejected from the information recording apparatus and is then newly loaded to another information recording apparatus, the correlation information recorded in the information recording medium can be used to appropriately control the recording device, as described above.

In an aspect of the information recording apparatus provided with the generating device, as described above, it may be further provided with a storing device for storing therein the generated correlation information.

By virtue of such construction, the once generated correlation information can be used continuously after the generation. Therefore, it is possible to save the load of generating the correlation information again when the recording device is controlled again.

In particular, the correlation information is stored into the storing device provided for the information recording apparatus. Thus, even if the record information is recorded onto another information recording medium, which is different from the information recording medium on which the correlation information is generated, it is necessary to use this correlation information to control the recording device. In particular, it is effective in performing the recording with respect to the information recording medium of the same type, in the same quality, from the same manufacturer, or the like.

At this time, the correlation information is preferably divided and stored in each identification number (e.g. manufacturer's number, disc ID, or the like) of the information recording medium.

(Information Recording Method)

The above object of the present invention can be also achieved by an information recording method in an information recording apparatus provided with: a recording device for recording record information onto an information recording medium by irradiating laser light with a predetermined power, the information recording method provided with: an adding process of adding weight to at least one of a plurality of reproduction features associated with the record information; and a controlling process of controlling the recording device to record the record information with a power in which the at least one reproduction feature with the weight added satisfies a predetermined first reference.

According to the information recording method of the present invention, it is possible to receive the various benefits owned by the aforementioned information recording apparatus of the present invention.

Incidentally, in response to the various aspects owned by the aforementioned information recording apparatus of the present invention, the information recording method of the present invention can employ various aspects.

(Computer Program)

The above object of the present invention can be also achieved by a computer program making a computer function as the aforementioned information recording apparatus (including its various aspects). More specifically, the computer program makes the computer function as at least one portion of the recording device, the adding device, and the controlling device.

According to each of the computer program of the present invention, the aforementioned information recording apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects owned by the aforementioned information recording apparatus of the present invention, the computer program of the present invention can employ various aspects.

The above object of the present invention can be also achieved by a computer program product in a computer-readable medium for tangibly embodying a program of instructions executable by a computer provided in the aforementioned information recording apparatus of the present invention (including its various aspects), to make the computer function as at least one portion of the recording device, the adding device, and the controlling device.

According to the computer program product of the present invention, the aforementioned information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus of the present invention.

These effects and other advantages of the present invention will become more apparent from the embodiment explained below.

As explained above, according to the information recording apparatus of the present invention, it is provided with the recording device, the adding device, and the controlling device. According to the information recording method of the present invention, it is provided with the adding process and the controlling process. Therefore, it is possible to record the record information while appropriately controlling the power of the laser light. As a result, it is possible to preferably improve the reproduction features of the record information to be recorded.

BRIEF DESCRIPTION OF DRAWINGS

FIG. 1 is a substantial plan view showing the basic structure of an optical disc, as one example of an information recording medium used for an information recording apparatus in an embodiment of the present invention, in which the optical disc has a plurality of recording areas.

FIG. 2 is a block diagram conceptually showing the basic structure of the information recording apparatus in the embodiment of the present invention.

FIG. 3 is a block diagram conceptually showing the basic structure of a reproduction feature detection circuit provided for the information recording apparatus in the embodiment.

FIG. 4 is a flowchart conceptually showing a flow of a first operation example of the information recording apparatus in the embodiment.

FIG. 5 is a schematic timing chart showing one OPC process in the case of 16 power steps, in the operation of the information recording apparatus in the embodiment.

FIG. 6 are graphs conceptually showing correlation information generated by an OPC operation on the information recording apparatus in the embodiment.

FIG. 7 is a graph conceptually showing the correlation information which indicates a correlation between a laser power and each of a RF error rate value, a jitter value, and an asymmetry value.

FIG. 8 is a graph conceptually showing the correlation information which indicates a correlation between a laser power and each of a RF error rate value, an AR feature, and an asymmetry value.

FIG. 9 is a graph conceptually showing the correlation information which indicates a correlation between a laser power and each of a RF error rate value, a wobble signal level value, and an asymmetry value.

FIG. 10 are waveform charts conceptually showing the pulse waveform of recording strategy, which defines the waveform of laser light LB emitted from an optical pickup.

FIG. 11 are tables showing a change in the reproduction features due to a change in a recording condition.

FIG. 12 is a flowchart conceptually showing a flow of a second operation example of the information recording apparatus in the embodiment.

FIG. 13 are tables showing a priority order used in the second operation example of the information recording apparatus in the embodiment.

DESCRIPTION OF REFERENCE CODES

1 information recording apparatus
100 Optical disc
501 optical pickup
503 RF amplifier
504 laser drive circuit
505 OPC circuit
510 reproduction feature detection circuit
521 RF amplitude measurement circuit
540 jitter measurement circuit
550 CPU
560 memory

BEST MODE FOR CARRYING OUT THE INVENTION

Hereinafter, the best mode for carrying out the present invention will be explained in each embodiment in order with reference to the drawings.

Firstly, with reference to FIG. 1, an explanation will be given on an information recording medium used for an information recording apparatus in an embodiment of the present invention. In the embodiment, the explanation will be given by using a recording-type optical disc as the information recording medium. FIG. 1 shows the structure of the optical disc having a plurality of recording areas is a substantial plan view on the upper side, in association with a conceptual view showing an area structure in the radial direction on the lower side.

As shown in FIG. 1, an optical disc 100 allows a plurality of or one recording (writing), wherein the recording can be performed in various recording methods, such as a magneto-optical method and a phase change method. The optical disc 100 has a recording surface on a disc main body with a diameter of about 12 cm, as in a DVD. On the recording surface, the optical disc 100 is provided with: a lead-in area 104; a data recording area 106; and a lead-out area 108, centered on a center hole 102 from the inner circumference to the outer circumference. Each area is provided with groove tracks and land tracks, which are alternately placed, spirally or concentrically, centered on the center hole 101. The groove track may be wobbled. One or both of the tracks may have pre-pits formed. Incidentally, the present invention is not particularly limited to the optical disc having these three areas. For example, even if the lead-in area 104 or the lead-out area 108 does not exist, a file structure explained below can be constructed. Moreover, the lead-in area 104 and the lead-out area 108 may be further segmentalized.

(Embodiment of Information Recording Apparatus)

Next, with reference to FIG. 2 to FIG. 13, the information recording apparatus in the embodiment of the present invention will be explained.

(Basic Structure)

Firstly, with reference to FIG. 2 and FIG. 3, the basic structure of the information recording apparatus in the embodiment will be discussed. FIG. 2 is a block diagram conceptually showing the basic structure of the information recording apparatus in the embodiment. FIG. 3 is a block diagram conceptually showing the basic structure of a reproduction feature detection circuit provided for the information recording apparatus in the embodiment.

As shown in FIG. 2, an information recording apparatus 1 in the embodiment includes: an optical pickup 501; a spindle motor 502; a RF (Radio Frequency) amplifier 503; a laser drive circuit 504; an OPC (Optimum Power Control) circuit 505; a tracking servo circuit 507; an actuator drive circuit 508; a reproduction feature detection circuit 510; an equalizer 520; a RF amplitude measurement circuit 521; a binarizing circuit 530; a decoder 531; a PLL (Phase Locked Loop) 532; a jitter measurement circuit 540; a CPU 550; and a memory 560.

The optical pickup 501 constitutes one specific example of the "recording device" of the present invention. The optical pickup 501 is to perform the recording/reproduction with respect to the optical disc 100, and is provided with a semiconductor laser apparatus, various lenses, an actuator, and the like. More specifically, the optical pickup 501 irradiates the optical disc 100 with a light beam, such as laser light LB, as reading light with a first power upon reproduction, and as writing light with a second power upon recording, with it modulated. Such a power adjustment of the laser light LB is performed under the control of the laser drive circuit 504, which is one specific example of the "controlling device" described later. More specifically, a driving pulse defined by predetermined pulse strategy allows the semiconductor laser apparatus to be driven, by which the laser light LB with a predetermined laser power is irradiated. Moreover, the optical pickup 501 is adapted to be displaced in the radial direction or the like of the optical disc 100 by the actuator drive circuit 508 driven by the tracking servo circuit 507, and by a not-illustrated slider or the like.

The spindle motor 502 is adapted to rotate the optical disc 100 at a predetermined speed and stop it, under spindle servo from a not-illustrated servo unit or the like.

The RF amplifier 503 amplifies a signal outputted from a not-illustrated PD (Photo Detector), which receives reflected light of the laser light LB emitted from the optical pickup 501, and outputs the amplified signal. Specifically, a RF signal (or a LPP signal, a wobble signal, or the like) as a reading signal is outputted to the reproduction feature detection circuit 510, the equalizer 520, the binarizing circuit 530, and the jitter measurement circuit 540.

The laser drive circuit 504 constitutes one specific example of the "controlling device" of the present invention, with the CPU 550. In an OPC process described later, the laser drive circuit 504 drives the semiconductor laser disposed in the optical pickup 501, in order to detect an optimum laser power by a process of recording and reproducing an OPC pattern described later. After that, in the data recording, the laser drive circuit 504 drives the semiconductor laser disposed in the optical pickup 501, with the optimum laser power detected by the OPC process. In the data recording, the optimum laser power is modulated in accordance with record data.

The OPC circuit 505 is adapted to output a signal which indicates the OPC pattern, to the laser drive circuit 504 when the OPC pattern is recorded in the OPC process before the recording operation. Incidentally, the OPC process will be explained in detail later (refer to FIG. 5 and the like).

The tracking servo circuit 507 is adapted to detect various servo signals, such as a tracking error signal, from the RF signal, as the reading signal coming from the optical pickup 501. Then the various servo signals can be outputted to the actuator drive circuit 508 or the spindle motor 502.

The actuator drive circuit 508 is adapted to control the displacement of the optical pickup in the radial direction or the rotational direction of the optical disc 100, on the basis of the various servo signals outputted from the tracking servo circuit 507. Then, various data can be recorded by that the optical pickup 501, whose displacement is controlled by the actuator drive circuit 508, irradiates a desired recording position on the optical disc 100 with the laser light LB.

The reproduction feature detection circuit 510 is adapted to detect various reproduction features on the basis of the output signal according to the amount of received light from the RF amplifier 503. Specifically, as shown in FIG. 3, the reproduction feature detection circuit 510 is provided with: a LPP (Land Pre Pit) detection circuit 5111; a GATE (LPP) generation circuit 5112; a LPP data detection circuit 5113; a LPP error rate detection circuit 5114; a WOB (Wobble) detection circuit 5121; a GATE (WOB) detection circuit 5122; a WOB data detection circuit 5123; a WOB error rate detection circuit 5124; an error rate detection circuit 5131; an ECC detection circuit 5132; an error correction circuit 5133; a RF error rate detection circuit 5134; a CAPA (Complimentary Allocated Pit Address) detection circuit 5141; a GATE (CAPA) generation circuit 5142; a CAPA data detection circuit 5143; a CAPA error rate detection circuit 5144; a cross-write detection circuit 5151; a cross-write cancel circuit 5152; a cross-write data detection circuit 5153; and a RF error rate detection circuit 5154.

The LPP detection circuit 5111 is adapted to detect a push-pull signal which indicates a LPP signal, on the basis of the output signal according to the amount of received light from the RF amplifier 503. At this time, in order to detect the push-pull signal, the light receiving element of the optical pickup 510 is preferably adapted to receive the reflected light of the laser light LB in a plurality of division areas, such as two-division and four-division.

Incidentally, the LPP is a pit formed in advance on the recording track (particularly, land track) of a DVD-R/RW or the like, which is one specific example of the optical disc 100. For example, the LPP is used to generate a recording clock signal in the data recording and an address position on the optical disc 100.

The GATE (LPP) generation circuit 5112 is adapted to generate a gate signal for detecting LPP data. Specifically, by generating the gate signal with respect to wobble in which the LPP is formed, the LPP data can be detected and noise included in the LPP data can be also effectively removed. Of course, the LPP data can be detected even by using the gate signal generated by detecting a wobble signal.

The LPP data detection circuit 5113 is adapted to detect the LPP data from the LPP signal outputted from the LPP detection circuit 5111, on the basis of the gate signal generated by the GATE (LPP) generation circuit 5112. For example, the LPP data detection circuit 5113 is adapted to detect, from the LPP data, pre-format address information which indicates an address position on the optical disc 100 and information which indicates a clock in the recording operation.

The LPP error rate detection circuit 5114 is adapted to detect an incidence ratio of errors (i.e. LPP error rate) of the LPP data detected on the LPP data detection circuit 5113. The error rate is referred to as a LPP feature after recording (or BERLPPa: Block Error Rate LPP after) and indicates the same numerical value as that of an AR feature.

Now, a brief explanation is given on the AR feature. The optical pickup 501 is provided with a not-illustrated two-division light receiving circuit and can generate the push-pull signal from each divisional reproduction signal. Then, a ratio between the maximum amplitude and the minimum amplitude of a LPP (Land Pre Pit) signal component existing between the groove tracks, which are recording tracks provided on the optical disc 100, out of the push-pull signal component is referred to as the AR feature. For example, the maximum amplitude and the minimum amplitude of the reproduction signal can be recognized by superimposing the reproduction signal in reproducing the LPP provided on the DVD-R/RW, on an oscilloscope. By this, the AR feature can be calculated. In the information recording apparatus, however, the calculation of the error rate of the LPP data is same as the measurement of the AR feature, and the same operation can be performed.

In the LPP signal, there are recorded address information and recording strategy information or the like specific to the optical disc 100 necessary in the recording. Moreover, the LPP signal is a basic signal necessary to generate the recording clock, which is particularly required when the data is recorded for the first time or when the data is recorded in the middle (i.e. written once or additionally recorded). The LPP signal is an important signal for a DVD-R and a DVD-RW, which are one specific example of the optical disc 100. However, the signal quality of the LPP signal deteriorates when the data is recorded on the groove track. Thus the LPP signal quality after recording is defined on the standard (refer to DVD Specifications for Recordable Disc). Its expression by a numerical value can be said as the AR feature.

The WOB detection circuit 5121 is adapted to detect a push-pull signal which indicates a wobble signal (WOB signal), on the basis of the output signal according to the amount of received light from the RF amplifier 503.

Incidentally, the wobble is oscillation or wave of the recording track on the optical disc 100. For example, in a DVD-R/RW as one specific example of the optical disc 100, the recording track is wobbled in a fixed period. In a DVD+R/RW as one specific example of the optical disc 100, the recording track is BPM (Bi Phase Modulation)-modulated and wobbled. In a DVD-RAM as one specific example of the optical disc 100, the recording track is wobbled in a fixed period, except for a portion where a CAPA signal is recorded. The wobble is used to generate the pre-format address information, which indicates an address position on the optical disc 100, and the recording clock signal in the data recording.

The GATE (WOB) generation circuit 5122 is adapted to generate a gate signal for detecting wobble data (WOB data). Specifically, by generating the gate signal with respect to the wobble, the wobble data can be detected, and noise included in the wobble data can be effectively removed.

The WOB data detection circuit 5123 is adapted to detect the wobble data from the wobble signal outputted from the WOB detection circuit 5121, on the basis of the gate signal generated by the GATE (WOB) generation circuit 5122. For example, the WOB data detection circuit 5123 is adapted to detect, from the wobble data, the information which indicates a clock in the recording operation.

The wobble error rate detection circuit 5124 is adapted to detect an incidence ratio of errors (i.e. WOB error rate) of the wobble data detected on the wobble data detection circuit 5123.

The error rate detection circuit 5131 is adapted to detect a RF signal for detecting an error rate, on the basis of the output signal according to the amount of received light from the RF amplifier 503.

The ECC detection circuit 5132 is adapted to detect an ECC (Error Correction Code) for performing an error correction process, which is appended to reproduction data obtained by reproducing the RF signal.

The error correction circuit 5133 is adapted to perform the error correction process, on the reproduction data obtained by reproducing the RF signal outputted from the error rate detection circuit 5131, on the basis of the ECC detected by the ECC detection circuit 5132

The RF error rate detection circuit 5134 is adapted to detect a RF error rate, on the basis of the result of the error correction process performed on the error correction circuit 5133.

The CAPA detection circuit 5141 is adapted to detect a push-pull signal which indicates a CAPA signal, on the basis of the output signal according to the amount of received light from the RF amplifier 503.

Incidentally, CAPA is address information recorded on the recording track of a DVD-RAM or the like, which is one specific example of the optical disc 100, by using pits formed in advance in each one sector. For example, the CAPA is used to generate an address position on the optical disc 100.

The GATE (CAPA) generation circuit 5142 is adapted to generate a gate signal for detecting CAPA data.

The CAPA data detection circuit 5143 is adapted to detect the CAPA data from the CAPA signal outputted from the CAPA detection circuit 5141, on the basis of the gate signal generated by the GATE (CAPA) generation circuit 5142. For example, the CAPA data detection circuit 5143 is adapted to detect the address information from the CAPA data.

The CAPA error rate detection circuit 5144 is adapted to detect an incidence ratio of errors (i.e. CAPA error rate) of the CAPA data detected on the CAPA data detection circuit 5143.

The cross-write detection circuit 5151 is adapted to detect a RF signal or a push-pull signal for detecting a cross-write amount, on the basis of the output signal according to the amount of received light from the RF amplifier 503.

Incidentally, the "cross-write" indicates an adverse influence on another recording track, caused by that the another recording track adjacent to one recording track is unexpectedly irradiated with the laser light LB when the laser light LB is emitted to the one recording track. In this case, the another recording track adjacent to the one recording track includes not only the recording track existing on the same recording layer as that of the one recording track but also the recording track existing on another recording layer, which is different from the recording layer on which the one recording track exists.

The cross-write cancel circuit 5152 is adapted to cancel the cross-write generated on the optical disc 100.

The cross-write data detection circuit 5153 is adapted to detect cross-write data (i.e. a cross light amount).

The RF error rate detection circuit 5154 is adapted to detect a RF error rate, on the basis of the cross-write data.

The equalizer 520 is adapted to perform predetermined filtering (or signal processing) on the RF signal detected by the RF amplifier 503 or the like, and to output the signal after filtering (e.g. envelope detection or the like) to the RF amplitude measurement circuit 521.

The RF amplitude measurement circuit 521 is adapted to detect a peak value and a bottom value of the envelope detection of the RF signal, which is the output signal from the RF amplifier 503, in order to detect an optimum laser power, under the control of the CPU 550, when the OPC pattern is reproduced in the OPC process. The RF amplitude measurement circuit 521 may include, for example, an A/D (Analog/Digital) converter or the like.

The binalizing circuit 530 is adapted to generate a binary signal from the RF signal detected by the RF amplifier 503 or the like. Specifically, for example, the binalizing circuit 530 generates a pulse-array from the detected RF signal or the like. Then, the binalizing circuit 530 is adapted to output the binarized signal to each of the decoder 531 and the PLL 532.

The decoder 531 is adapted to decode or demodulate the RF signal, which is binalized on the binalizing circuit 530, to thereby output the reproduction data to the exterior through a buffer and an external output interface. Then, predetermined contents are reproduced and outputted, on external output equipment (e.g. a display device, such as a liquid crystal display and a plasma display, a speaker or the like) connected to the external output interface.

The PLL 532 is adapted to generate a clock signal, which is a reference in the reproduction operation, on the basis of the binary signal (particularly, a binalized LPP signal and a binalized wobble signal) outputted from the binalizing circuit 530.

The jitter measurement circuit 540 is adapted to detect a jitter value from the RF signal detected by the RF amplifier 503.

The CPU 550 receives the data from e.g. the tracking servo circuit 507, the reproduction feature detection circuit 510, the RF amplitude measurement circuit 521, the jitter measurement circuit 540, or the like, in order to control the operation of the entire information recording apparatus 1, to thereby perform a subsequent control operation. Then, the CPU 550 outputs a system command to each of the devices provided for the information recording apparatus 1 on the basis of the data, and controls the entire information recording apparatus 1. Normally, software for operating the CPU 550 is stored in an external memory, for example.

The memory 560 includes a semiconductor memory, such as a RAM (Random Access Memory) and a flush memory, and it is adapted to temporarily record therein the various data necessary for the operation of the information recording apparatus 1. Moreover, as described later, the memory 560 is adapted to record therein a correlation equation, an optimum laser power, correlation information, or the like.

Incidentally, in the aforementioned information recording apparatus 1, the constitutional elements required in the embodiment are selectively extracted and illustrated in order to explain the characteristics of the present invention more plainly. Thus, it is obvious that constitutional elements other than the aforementioned constitutional requirements may be provided.

Moreover, all the constitutional elements in the reproduction feature detection circuit 510 are not necessarily provided. For example, if the optical disc 100 is a DVD-R/RW, the reproduction feature detection circuit 510 is not necessarily provided with the CAPA detection circuit 5141, the GATE (CAPA) generation circuit 5142, the CAPA data detection circuit 5143, and the CAPA error rate detection circuit 5144. The point is that the reproduction feature detection circuit 510 only needs to be provided with necessary constitutional elements in accordance with the type of the optical disc 100 that is a recording target of the information recording apparatus 1.

(Operation Principle)

Next, with reference to FIG. 4 to FIG. 14, the operation principle of the information recording apparatus 1 in the embodiment will be explained.

(1) First Operation Example

Firstly, with reference to FIG. 4, an explanation will be given on a flow of a first operation example of the information recording apparatus 1 in the embodiment. FIG. 4 is a flowchart conceptually showing the flow of the first operation example of the information recording apparatus in the embodiment.

As shown in FIG. 4, firstly, the optical disc 100 is loaded on the information recording apparatus 1 (step S101). Then, a seek operation is performed by the optical pickup 501 under the control of the CPU 550, to thereby obtain various management data, which is necessary for the recording process performed on the optical disc 100. In particular, by reading the land pre pit (LPP) in the lead-in area 104, the predetermined (or as default) pulse strategy set in advance is obtained. On the basis of the management data, the data is recorded onto the optical disc 100 through e.g. an external input interface or the like, in response to an instruction from e.g. external input equipment, under the control of the CPU 550.

After the loading operation, the OPC (Optimum Power Control) operation is performed (step S102).

Now, a detailed explanation is given on the OPC process, with reference to FIG. 5. FIG. 5 is a schematic timing chart showing one OPC process in the case of 16 power steps, in the operation of the information recording apparatus in the embodiment.

Firstly, under the control of the CPU 550, the optical pickup 501 is displaced to a PCA (Power Control Area) located in the lead-in area 104 or the like on the optical pickup 100. Then, while the recording laser power (e.g. mutually different 16-step recording laser powers) is changed, sequentially and step by step, to thereby record a test signal, such as the OPC pattern, into the PCA. Specifically, a test signal, such as a reference OPC pattern, as shown in FIG. 5, generated by the OPC circuit 505 is recorded. As the test signal, for example, a 3T to 11T or 14T random pattern is listed as one example. The OPC pattern is generated in accordance with predetermined strategy, under the control of the CPU 550. FIG. 5 shows, as one specific example, an aspect of recording an OPC pattern including a first pit section and a second pit section with using each laser power which is changed step by step, wherein a 3T pattern test signal of the random pattern is recorded in the first section and an 11T pattern test signal is recorded in the second section. Of course, a different OPC pattern may be used in each laser power changed step by step.

The laser drive circuit 504 drives the semiconductor laser in the optical pickup 501 to change the laser power sequentially and step by step, by using the OPC pattern.

Then, after the completion of the recording of the OPC pattern into the PCA, the recording portion (i.e. OPC pattern) in the PCA is reproduced, under the control of the CPU 550. Then, for each laser power changed step by step, the various reproduction features are detected from the reproduced RF signal. For example, an asymmetry value (or $\beta$ value) may be detected from the RF peak value and the RF bottom value measured by the operation of the RF amplitude measurement circuit 521. The jitter value may be detected by the operation of the jitter measurement circuit 540. The AR feature (or LPP feature after recording) may be detected by the operation of the LPP data detection circuit 5113 or the LPP error rate detection circuit 5114. A wobble signal level value (i.e. C/N ratio) may be detected by the operation of the WOB data detection circuit 5123 or the WOB error rate detection circuit 5124. A RF error rate value may be detected by the operation of the RF error rate detection circuit 5134. A CAPA signal level value (i.e. C/N ratio) may be detected by the operation of the CAPA data detection circuit 5143 or the CAPA error rate detection circuit 5144. The cross-write amount may be detected by the operation of the cross-write data detection circuit 5153 or the RF error rate detection circuit 5154. The detection of such reproduction features is performed in each laser power changed step by step, in one OPC process, in accordance with the number of recording of the OPC pattern, for example.

In FIG. 4 again, correlation information, which indicates a correlation between the laser power and each of the plurality of reproduction features, is generated on the basis of the result of the OPC process, under the control of the CPU 550, which constitutes one specific example of the "generating device" of the present invention (step S103). Information which indicates a relationship between the laser power changed sequentially and step by step and each of the various reproduction features of the OPC pattern recorded with the relevant laser power is generated from the correlation information, as shown in FIG. 6. Incidentally, FIG. 6 are graphs conceptually showing the correlation information generated by the OPC operation.

For example, on a graph in which a vertical axis indicates the RF error rate value and a horizontal axis indicates the laser power changed step by step, the RF error rate values obtained by the reproduction of the OPC pattern are plotted and connected in an approximate curve. By this, the correlation information as shown in FIG. 6(a) can be obtained. The approximate curve can be prepared by using a mathematical or statistical method, such as a least-squares method.

Moreover, even in the jitter value, which is another reproduction feature, the correlation information as shown in FIG.

6(*b*) can be obtained similarly. Moreover, even in the asymmetry value, which is another reproduction feature, the correlation information as shown in FIG. 6(*c*) can be obtained similarly. Of course, the same is true for the other reproduction features.

In FIG. 4 again, under the control of the CPU 550, it is judged whether or not there is a laser power in which all the obtained reproduction features are good (in other words, all the obtained reproduction features are included in an allowable range determined by the standard) (step S104).

As a result of the judgment in the step S104, if it is judged that there is the laser power in which all the obtained reproduction features are good (the step S104: Yes), particularly the laser power in which the high-priority (i.e. weighted) reproduction feature out of the obtained reproduction features is optimal is selected from the laser power in which all the reproduction features are good, under the control of the CPU 550, which constitutes one specific example of the "adding device" of the present invention (step S105). In other words, under the control of the CPU 550, the reproduction feature, which is most emphasized, out of the obtained reproduction features is selected, and the laser power in which the selected reproduction feature is optimal is selected.

The operation of selecting the laser power will be explained specifically, with reference to FIG. 7 to FIG. 9. FIG. 7 is a graph conceptually showing the correlation information which indicates a correlation between the laser power and each of the RF error rate value, the jitter value, and the asymmetry value. FIG. 8 is a graph conceptually showing the correlation information which indicates a correlation between the laser power and each of the RF error rate value, the AR feature, and the asymmetry value. FIG. 9 is a graph conceptually showing the correlation information which indicates a correlation between the laser power and each of the RF error rate value, the wobble signal level value, and the asymmetry value.

On a graph in which a vertical axis indicates each of the reproduction features of the RF error rate value, the jitter value, and the asymmetry value and a horizontal axis indicates the laser power changed step by step, the RF error rate values, the jitter values, and the asymmetry values obtained by the reproduction of test data are separately plotted and connected in an approximate curve. By this, the correlation information as shown in FIG. 7 can be obtained. The approximate curve can be prepared by using a mathematical or statistical method, such as a least-squares method, as described above.

As shown in FIG. 7, in a laser power range of 27.5 mW to 29.0 mW, the RF error rate value is less than or equal to "$6.5 \times 10^{-5}$", the jitter value is less than or equal to "8.0%", and the asymmetry value is −0.04 to 0.03. Therefore, it is judged that there is the laser power in which all the obtained reproduction features are good.

In this case, for example, from the viewpoint of ensuring reproduction compatibility in a plurality of information reproducing apparatuses (players), the RF error rate value is preferably selected as the reproduction feature which is most emphasized. In this case, a laser power "28.6 mW" at which the RF error rate value is optimal (e.g. the smallest) is preferably determined to be the laser power for actually recording the data.

As described above, if it is emphasized to ensure the reproduction compatibility in the plurality of information reproducing apparatuses (players), the information recording apparatus 1 in the embodiment is preferably adapted to determine the laser power while particularly emphasizing the RF error rate value from among the plurality of reproduction features. In this case, the condition that "the RF error rate value is optimal (e.g. the smallest)" corresponds to one specific example of the "first reference" of the present invention. Moreover, the condition that "the reproduction features other than the RF error rate value are good (e.g. they are included in the allowable range determined by the standard)" corresponds to one specific example of the "second reference" of the present invention. That is, the condition that "the high-priority reproduction feature is optimal" in the step S105 in FIG. 4 corresponds to one specific example of the "first reference" of the present invention, and the condition that "the reproduction features are good" in the step S104 in FIG. 4 corresponds to one specific example of the "second reference" of the present invention.

On the other hand, on a graph in which a vertical axis indicates each of the reproduction features of the RF error rate value, the AR feature, and the asymmetry value and a horizontal axis indicates the laser power changed step by step, the RF error rate values, the AR features, and the asymmetry values obtained by the reproduction of test data are separately plotted and connected in an approximate curve. By this, the correlation information as shown in FIG. 8 can be obtained. The approximate curve can be prepared by using a mathematical or statistical method, such as a least-squares method, as described above.

As shown in FIG. 8, in a laser power range of 27.5 mW to 29.5 mW, the RF error rate value is less than or equal to "$6.6 \times 10^{-5}$", the AR feature is more than or equal to "10.0%", and the asymmetry value is −0.05 to 0.06. Therefore, it is judged that there is the laser power in which all the obtained reproduction features are good.

In this case, for example, from the viewpoint of ensuring a performance of additional recording of data in the case where the LPP is used for address control (e.g. if the optical pickup 100 is a DVD-R/RW), the AR feature is preferably selected as the reproduction feature which is most emphasized. In this case, a laser power "27.5 mW" at which the AR feature is optimal (e.g. the largest) is preferably determined to be the laser power for actually recording the data.

As described above, if it is emphasized to ensure the performance of additional recording of data in the case where the LPP is used for address control, the information recording apparatus 1 in the embodiment is preferably adapted to determine the laser power while particularly emphasizing the AR feature from among the plurality of reproduction features. In this case, the condition that "the AR feature is optimal (e.g. the largest)" corresponds to one specific example of the "first reference" of the present invention. Moreover, the condition that "the reproduction features other than the AR feature are good (e.g. they are included in the allowable range determined by the standard)" corresponds to one specific example of the "second reference" of the present invention.

On the other hand, on a graph in which a vertical axis indicates each of the reproduction features of the RF error rate value, the wobble signal level value, and the asymmetry value and a horizontal axis indicates the laser power changed step by step, the RF error rate values, the wobble signal level values, and the asymmetry values obtained by the reproduction of test data are separately plotted and connected in an approximate curve. By this, the correlation information as shown in FIG. 9 can be obtained. The approximate curve can be prepared by using a mathematical or statistical method, such as a least-squares method, as described above.

As shown in FIG. 9, in a laser power range of 27.5 mW to 29.5 mW, the RF error rate value is less than or equal to "$6.6 \times 10^{-5}$", the wobble signal level value is more than or equal to "25.0", and the asymmetry value is −0.05 to 0.06.

Therefore, it is judged that there is the laser power in which all the obtained reproduction features are good.

In this case, for example, from the viewpoint of ensuring the performance of additional recording of data in the case where the wobble modulation is used for address control (e.g. if the optical pickup 100 is a DVD+R/RW), the wobble signal level value is preferably selected as the reproduction feature to be most emphasized. In this case, a laser power "27.5 mW" at which the wobble signal level value is optimal (e.g. the largest) is preferably determined to be the laser power for actually recording the data.

As described above, if it is emphasized to ensure the performance of additional recording of data in the case where the wobble modulation is used for address control, the information recording apparatus 1 in the embodiment is preferably adapted to determine the laser power while particularly emphasizing the wobble signal level value from among the plurality of reproduction features. In this case, the condition that "the wobble signal level value is optimal (e.g. the largest)" corresponds to one specific example of the "first reference" of the present invention. Moreover, the condition that "the reproduction features other than the wobble signal level value are good (e.g. they are included in the allowable range determined by the standard)" corresponds to one specific example of the "second reference" of the present invention.

Moreover, the laser power may be determined by particularly emphasizing the reproduction feature under a more severe condition as compared to the allowable range determined by the standard. In other words, the laser power may be determined by particularly emphasizing the reproduction feature whose margin is small with respect to the upper limit or lower limit of the allowable range determined by the standard.

For example, if the correlation information shown in FIG. 7 is obtained, the jitter value has a value of "8.0" in the laser power range of 27.5 mW to 29.0 mW in which all the obtained reproduction features are good. At this time, since the margin is small with respect to the upper limit, 8.0, of the allowable range of the jitter value, the jitter value may be particularly emphasized to determine the laser power. In this case, the laser power "27.8 mW" in which the jitter value is optimal (e.g. the smallest) is determined to be the laser power for actually recording the data.

Moreover, if it is emphasized to ensure a random access performance to the recording area on the optical disc 100, the laser power is preferably determined by particularly emphasizing the CAPA signal level value from among the plurality of reproduction features. That is, the laser power in which the CAPA signal level value is optimal (e.g. the largest) is preferably determined to be the laser power for actually recording the data.

Moreover, the reproduction feature which is most emphasized may be selected in accordance with the recording speed. For example, if the recording speed is nearly "1×" and "2×", the jitter value or the asymmetry value may be particularly emphasized from among the plurality of reproduction features, to thereby determined the laser power. That is, the laser power in which the jitter value is optimal (e.g. the smallest) or in which the asymmetry value is optimal (e.g. substantially "0") may be determined to be the laser power in actually recording the data. If the recording speed is nearly "4×", the AR feature may be particularly emphasized from among the plurality of reproduction features, to thereby determine the laser power. That is, the laser power in which the AR feature is optimal (e.g. the largest) may be determined to be the laser power in actually recording the data. If the recording speed is more than or equal to "8×", the RF error rate or the AR feature or the like may be emphasized from among the plurality of reproduction features, to thereby determine the laser power.

That is, the laser power in which the RF error rate value or the like is optimal (e.g. the smallest) may be determined to be the laser power in actually recording the data.

Moreover, if the data is recorded onto the optical disc 100 with the relatively small track pitch of the recording track or onto the optical disc 100 with two or more recording layers laminated thereon, the cross-write amount may be emphasized from among the plurality of reproduction features, to thereby determine the laser power. That is, the laser power in which the cross-write amount is optimal (e.g. substantially "0") may be determined to be the laser power in actually recording the data.

Moreover, which of the plurality of reproduction features is particularly emphasized may be selected in accordance with the type of the optical disc 100.

For example, in a DVD-R/RW, which is one specific example of the optical disc 100, the address information and the other important control information or the like are recorded by using the LPP. Therefore, if the data is recorded onto the DVD-R/RW, the AR feature may be particularly emphasized to determine the laser power. That is, the laser power in which the AR feature is optimal (e.g. the largest) may be determined to be the laser power in actually recording the data.

For example, in a DVD+R/RW or a Blu-ray Disc, which is one specific example of the optical disc 100, the address information and the other important control information or the like are recorded by the modulation performed on the wobble. Therefore, if the data is recorded onto the DVD+R/RW, the wobble signal level value may be particularly emphasized to determine the laser power. That is, the laser power in which the wobble signal level value is optimal (e.g. the largest) may be determined to be the laser power in actually recording the data.

For example, in a DVD-RAM, which is one specific example of the optical disc 100, the address information and the other important control information or the like are recorded by using the CAPA. Therefore, if the data is recorded onto the DVD-RAM, the CAPA signal level value may be particularly emphasized to determine the laser power. That is, the laser power in which the CAPA signal level value is optimal (e.g. the largest) may be determined to be the laser power in actually recording the data.

In FIG. 4 again, the data to be actually recorded is recorded from a predetermined address position on the optical disc 100 (step S106). Here in order to irradiate the laser light LB by using the driving pulse according to the laser power determined in the step S105, the optical pickup 501 (more specifically, the semiconductor laser apparatus) is controlled by the operation of the laser drive circuit 504 under the control of the CPU 550. Then, the data is recorded mainly into the data recording area 106 shown in FIG. 1.

Specifically, the data for recording, inputted from the external input interface or the like, is DVD-modulated (e.g. 8-16 modulated) by a DVD modulator. Then, an ECC code, which is a code for data error correction, is appended to the modulated data in each predetermined block unit (e.g. ECC block unit). After that, the optical pickup 510 emits the desired laser light LB, by which the modulation is performed and the data for recording with the ECC code appended is recorded onto the optical disc 100 as a recording pit, recording mark, or recording pattern.

After that, it is judged whether or not the recording of all the data is ended. As a result of the judgment, if it is judged that all the data is ended, the recording operation is ended as it is, and if necessary, a finalize process for maintaining the compatibility with a DVD-ROM may be performed, or the optical disc 100 may be ejected from the information recording apparatus 1.

On the other hand, as a result of the judgment in the step S104, if it is judged that there is no laser power in which all the obtained reproduction features are good (the step S104: No), then it is judged whether or not a recording condition can be changed under the control of the CPU 550 (step S107).

As a result of the judgment in the step S107, if it is judged that the recording condition cannot be changed (the step S107: No), it is judged that the data cannot be recorded by using the laser light LB with the preferable laser power. As a result, the data recording operation is stopped (step S109). At this time, a warning statement or the like, which indicates that the data cannot be recorded, may be displayed on a display.

On the other hand, as a result of the judgment in the step S107, if it is judged that the recording condition can be changed (the step S107: Yes), the recording condition is changed under the control of the CPU 550 (step S108). After that recording condition is changed, the process from the step S102 is continued again.

Here, the operation of changing the recording condition will be explained in more detail, with reference to FIG. 10 and FIG. 11. FIG. 10 are waveform charts conceptually showing the pulse waveform of recording strategy, which defines the waveform of the laser light LB emitted from an optical pickup 501. FIG. 11 are tables showing a change in the reproduction features due to a change in the recording condition.

When the laser light LB is irradiated, the semiconductor laser in the optical pickup 501 is driven in accordance with the recording strategy which has a shape as shown in FIG. 10(a). The recording strategy is constructed by combining a top pulse with an amplitude Po and a middle pulse with an amplitude Pm.

As the change in the recording condition, for example, the extent of the amplitude Pm of the middle pulse may be changed. Alternatively, a pulse width Twt may be changed.

FIG. 11(a) shows an influence on the reproduction features if the amplitude Pm of the middle pulse is changed. As shown in FIG. 11(a), it is assumed that Po/Pm is changed from "1.55" to "1.65" by changing the amplitude Pm of the middle pulse. That is, it is assumed that the amplitude Pm of the middle pulse is reduced. In this case, the AR feature increases from 19% to 22%, by "3%".

Moreover, this is not shown in FIG. 11(a), but reducing the amplitude Pm of the middle pulse causes the cross-write amount to be reduced, the CAPA signal level value to be increased, the wobble signal level value to be increased, and the RF error rate to be reduced. In contrast, increasing the amplitude Pm of the middle pulse causes the AR feature to be reduced, the cross-write amount to be increased, the CAPA signal level value to be reduced, the wobble signal level value to be reduced, and the RF error rate to be increased.

Incidentally, the same effect as the reduction in the amplitude Pm of the middle pulse is also obtained by reducing a multi pulse width Tmp in the multi-pulse-shaped recording strategy, shown in FIG. 10(b). Therefore, reducing the multi pulse width Tmp causes the AR feature to be increased, the cross-write amount to be reduced, the CAPA signal level value to be increased, the wobble signal level value to be increased, and the RF error rate to be reduced. In contrast, increasing the multi pulse width Tmp causes the AR feature to be reduced, the cross-write amount to be increased, the CAPA signal level value to be reduced, the wobble signal level value to be reduced, and the RF error rate to be increased.

Moreover, in addition to or instead of the change in the recording strategy, a recording linear velocity when the data is recorded onto the optical disc 100 may be changed. For example, if the data recording is performed at a recording speed of "Nx (wherein N is an integer of 1 or more)", the recording linear velocity may be changed while the recording speed remains at "Nx". Alternatively, the recording linear velocity may be changed such that the recording speed becomes "Mx (wherein M is an integer of 1 or more, different from N)".

FIG. 11(b) shows an influence on the reproduction features if the recording linear velocity is changed. As shown in FIG. 11(b), it is assumed that the recording linear velocity is changed from "8×(8-time speed)" to "6×(6-time speed)". In this case, the jitter value reduces from "8.5%" to "7.5%", by "1%".

Alternatively, the recording density of the data recorded on the optical disc 100 may be changed. For example, the recording density of the data can be changed by changing the recording linear velocity without changing the recording clock.

FIG. 11(c) shows an influence on the reproduction features if the recording density is changed. As shown in FIG. 11(c), it is assumed that the recording linear velocity is changed from "20.0 [m/s]" to "20.9 [m/s]". In this case, the jitter value reduces from "8.1%" to "6.6%", by "1.2%".

On the basis of the relationship between the "change in the recording condition" and the "change in the reproduction features associated with the change in the recording condition" explained above, the recording condition is changed such that the desired reproduction feature becomes optimal or good. Which recording condition is changed how much is preferably determined, individually and specifically, for example, in accordance with the relationship between the "change in the recording condition" and the "change in the reproduction features associated with the change in the recording condition", experimentally, experientially, mathematically, or theoretically, or by using simulations or the like. Then, the OPC process is performed again after the change, and eventually the preferable laser power is determined.

Incidentally, the allowable range of the AR feature by the standard is more than or equal to "15%" in a DVD-R, and it is more than or equal to "10%" in a DVD-RW. Therefore, if the AR feature is included in this range, the AR feature is judged to be good.

Moreover, the allowable range of the jitter value by the standard is less than or equal to "8%". Therefore, if the jitter value is included in this range, the jitter value is judged to be good.

Moreover, the allowable range of the asymmetry value by the standard is "−0.05" to "0.15". Therefore, if the asymmetry value is included in this range, the asymmetry value is judged to be good.

Moreover, the allowable range of the wobble signal level value by the standard is WOA>31 dB. Therefore, if the wobble signal level value is included in this range, the wobble signal level value is judged to be good.

Moreover, the allowable range of the CAPA signal level value by the standard is $1.0 \times 10^{-4}$ (Address Error Ratio) in a DVD-RAM. Therefore, if the CAPA signal level value is included in this range, the CAPA signal level value is judged to be good.

Moreover, the allowable range of the RF error rate value by the standard is less than or equal to $3.0 \times 10^{-3}$. Therefore, if the RF error rate value is included in this range, the RF error rate value is judged to be good.

Moreover, the allowable range of the cross-write amount by the standard is less than or equal to 12%. Therefore, if the cross-write amount is included in this range, the cross light amount is judged to be good.

Consequently, according to the information recording apparatus 1 in the embodiment, the laser power can be preferably determined. Thus, as long as the optical pickup 501 is controlled to irradiate the laser light LB by using the driving pulse according to the laser power, it is possible to further improve the reproduction features of the data to be recorded.

In particular, the reproduction feature to be emphasized out of the plurality of reproduction features can be selected in accordance with the recording state at that time, to thereby determine the laser power. More specifically, for example, the laser power can be determined by selecting the reproduction feature to be emphasized, in accordance with whether or not the reproduction compatibility is ensured, whether or not the performance of additional recording is ensured, whether or not the random access performance is ensured, how fast the recording speed is, whether or not there is the reproduction feature with a small margin with respect to the upper limit or lower limit of the allowable range, how much the cross-write amount is, or the like. Therefore, as compared to the information recording apparatus which determines the laser power such that a certain reproduction feature is uniformly optimal, the data can be recorded with a more preferable laser power in view of the actual recording state. As a result, it is possible to further improve the reproduction features of the data to be recorded.

Incidentally, the state that "the reproduction feature is optimal" in the embodiment indicates the state that the reproduction feature has a certain value at a pinpoint (e.g. that it is the largest, the smallest, or has a particular value, or the like). However, a more severe state than that "the reproduction feature is good" (e.g. a state that the reproduction feature is included in a range of further limiting the allowable range determined by the standard, or the like) may be treated as the state that "the reproduction feature is optimal". That is, the state that "the reproduction feature is optimal" does not necessarily indicate the state that the reproduction feature has a certain value at a pinpoint. If it is in the severe state than that "the reproduction feature is good", it can even include that the reproduction feature is included in a certain range.

Moreover, in the embodiment, there is only one reproduction feature to be particularly emphasized; however, obviously two or more reproduction features may be particularly emphasized. In this case, the laser power in which both of the two or more reproduction features are optimal is preferably determined to be the laser power in actually recording the data. However, it is also considered the case that there is no laser power in which both of the two or more reproduction features are optimal. Thus, the laser power which realizes the state that each of the two or more reproduction features is optimal to a certain degree (e.g. the state that each of the two or more reproduction features is nearly optimal) may be determined to be the laser power in actually recording the data. Alternatively, as explained in a second operation example, a priority order may be set to each of the two or more reproduction features, and the reproduction features may be emphasized in descending order of priority. The point is that the operation is included in the scope of the present invention as long as one or a plurality of reproduction features to be particularly emphasized are selected from among the plurality of reproduction features in accordance with the recording state at that time, and as long as the laser power in which the selected one or plurality of reproduction features to be particularly emphasized are optimal or optimal to a certain degree is determined to be the laser power in actually recording the data.

Moreover, it may be constructed such that a user can select the reproduction feature (features) which is (are) emphasized from among the plurality of reproduction features. Of course, it may be also constructed such that can be automatically selected without a user's instruction, under the control of the CPU 550.

Moreover, the correlation information as shown in FIG. 6 to FIG. 9 may be recorded into the memory 560, which is one specific example of the "storing device" of the present invention, or a predetermined recording area on the optical disc 100. Moreover, the laser power determined in the step S105 in FIG. 4 may be also stored into the memory 560 or a predetermined recording area on the optical disc 100.

(2) Second Operation Example

Next, with reference to FIG. 12 and FIG. 13, a second operation example of the information recording apparatus 1 in the embodiment will be explained. FIG. 12 is a flowchart conceptually showing a flow of the second operation example of the information recording apparatus in the embodiment. FIG. 13 are tables showing a priority order used in the second operation example of the information recording apparatus in the embodiment. Incidentally, the same process as that in the aforementioned first operation example carries the same step number, and the explanation thereof will be omitted.

As shown in FIG. 12, the optical disc 100 is loaded on the information recording apparatus 1 (the step S101), the OPC operation is performed (the step S102), and the correlation information, which indicates the correlation between the laser power and each of the plurality of reproduction features, is generated (the step S103).

At this time, under the control of the CPU 550, which constitutes one specific example of the "adding device" of the present invention, a priority order is set to each of the plurality of reproduction features. The priority order is set in the same aspect that of the operation of "selecting the reproduction feature which is particularly emphasized", explained in the aforementioned first operation example.

For example, if it is emphasized to ensure the reproduction compatibility in the plurality of information reproducing apparatuses (players), a priority order "1" is set to the RF error rate value, a priority order "2" is set to the jitter value, and a priority order "3" is set to the asymmetry value, as shown in FIG. 13(*a*).

If it is emphasized to ensure the performance of additional recording of data in the case where the LPP is used for address control, a priority order "1" is set to the AR feature, a priority order "2" is set to the RF error rate, and a priority order "3" is set to the asymmetry value, as shown in FIG. 13(*b*).

If it is emphasized to ensure the performance of additional recording of data in the case where the wobble modulation is used for address control, a priority order "1" is set to the wobble signal level value (i.e. wobble (C/N)), a priority order "2" is set to the RF error rate, and a priority order "3" is set to the asymmetry value.

Then, a variable "t" is initialized to "1" (step S201). After that, it is judged whether or not the variable "t" is less than or equal to the number "n" of the reproduction features obtained in the step S103, under the control of the CPU 550 (step S202).

As a result of the judgment in the step S202, if it is judged that the variable "t" is less than or equal to the number "n" of the reproduction features (the step S202: Yes), it is judged whether or not there is a laser power in which the reproduction feature with the priority order which is set to "t" is good (step S203).

As a result of the judgment in the step S203, it is judged that there is no laser power in which the reproduction feature with the priority order which is set to "t" is good (the step S203: No), then it is judged whether or not the recording condition can be changed (the step S107).

As a result of the judgment in the step S107, if it is judged that the recording condition can be changed (the step S107: Yes), the recording condition is changed (the step S108). Here, the recording condition is changed such that the reproduction feature with the priority order which is set to "t" is good. After that, the process from the step S102 is continued again.

On the other hand, as a result of the judgment in the step S107, if it is judged that the recording condition cannot be changed (the step S107: No), the data recording operation is stopped (the step S109).

On the other hand, as a result of the judgment in the step S203, it is judged that there is the laser power in which the reproduction feature with the priority order which is set to "t" is good (the step S203: Yes), then it is judged whether or not the reproduction feature with the priority order which is set to a value other than "t" is good in the laser power in which the reproduction feature with the priority order which is set to "t" is optimal, under the control of the CPU 550 (step S204).

As a result of the judgment in the step S204, if it is judged that the reproduction feature with the priority order which is set to the value other than "t" is good in the laser power in which the reproduction feature with the priority order which is set to "t" is optimal (the step S 204: Yes), this laser power is determined to be the laser power in actually recording the data (step S205). After that the data is recorded (the step S106).

On the other hand, as a result of the judgment in the step S204, if it is judged that the reproduction feature with the priority order which is set to the value other than "t" is not good in the laser power in which the reproduction feature with the priority order which is set to "t" is optimal (the step S 204: No), the variable "t" is incremented (step S206), and then the process from the step S202 is continued again. That is, focusing on the reproduction feature to be prioritized next, the process from the step S202 is continued again.

On the other hand, as a result of the judgment in the step S202, if it is judged that that the variable "t" is not less than or equal to the number "n" of the reproduction features (the step S202: No), then it is judged whether or not the recording condition can be changed (the step S107).

As described above, according to the second operation example, focusing on the high-priority reproduction feature, the laser power in which the focused reproduction feature is optimal and in which the reproduction feature other than the focused reproduction feature is good is determined to be the laser power in actually recording the data. If the focused reproduction feature is not good, or if the reproduction feature other than the focused reproduction feature is not good even if the focused reproduction feature is optimal, then attention is focused on the reproduction feature with the priority order which is set to be next to that of the focused reproduction feature, and the same process is repeated. In other words, what is performed in the second operation example is the process of sequentially selecting the "reproduction feature to be particularly emphasized" in the first operation example from among the plurality of reproduction features in accordance with the set priority order. Therefore, according to the second operation example, the laser power can be determined while changing the reproduction feature to be particularly emphasized, as occasion demands. Even in this case, the priority order is set in accordance with the recording state. Thus, as long as the laser light LB which is determined is irradiated with the determined laser power, it is possible to further improve the reproduction features of the data to be recorded.

In the aforementioned embodiment, an explanation was given on the optical disc 100, as one example of the information recording medium, and the recorder related to the optical disc 100, as one example of the information recording apparatus. The present invention, however, is not limited to the optical disc and the recorder thereof, but can be applied to other various information recording media which support high-density recording or high transmission rate and the recorder thereof.

The present invention is not limited to the aforementioned embodiment, and various changes may be made, if desired, without departing from the essence or spirit of the invention which can be read from the claims and the entire specification. An information recording apparatus and method, and a computer program for recording control, all of which involve such changes, are also intended to be within the technical scope of the present invention.

INDUSTRIAL APPLICABILITY

The information recording apparatus and method, and the computer program according to the present invention can be applied to an information recording apparatus, such as a DVD recorder or player. Moreover, they can be applied to an information recording apparatus or the like, which is mounted on various computer equipment for consumer use or for business use, or which can be connected to various computer equipment.

The invention claimed is:
1. An information recording apparatus, comprising:
a recording device for recording record information onto an information recording medium by irradiating laser light with a predetermined power;
an adding device for adding weight to at least one of a plurality of reproduction features associated with the record information; and
a controlling device for controlling said recording device to record the record information with a power in which the at least one reproduction feature with the weight added satisfies a predetermined first reference,
wherein said adding device adds a priority order to each of the plurality of reproduction features,
wherein said controlling device controls said recording device to record the record information with a power in which a first reproduction feature with the relatively high priority order out of the plurality of reproduction features satisfies the first reference and in which at least one another reproduction feature other than the first reproduction feature out of the plurality of reproduction features satisfies a second reference, which is milder than the first reference, and
wherein in a condition where said controlling device cannot control said recording device to record the record information with the power in which the another reproduction feature satisfies the second reference, said controlling device controls said recording device to record the record information with a power in which a second reproduction feature, which is prioritized next to the first reproduction feature, satisfies the first reference and in which another reproduction feature other than the sec- ond reproduction feature out of the plurality of reproduction features satisfies the second reference.

2. The information recording apparatus according to claim 1, wherein said controlling device controls said recording device to record the record information with a power in which the at least one reproduction feature with the weight added satisfies the predetermined first reference and in which another reproduction feature other than the at least one reproduction feature with the weight added out of the plurality of reproduction features satisfies a second reference, which is milder than the first reference.

3. The information recording apparatus according to claim 1, wherein said adding device adds the weight in accordance with whether or not a margin in each of the plurality of reproduction features is small with respect to an allowable range determined for each of the plurality of reproduction features due to a standard of the information recording medium.

4. The information recording apparatus according to claim 1, wherein said adding device adds the weight in accordance with reproduction compatibility of the information recording medium in a plurality of types of information reproducing apparatuses.

5. The information recording apparatus according to claim 1, wherein said adding device adds the weight in accordance with a performance of additional recording in the information recording medium.

6. The information recording apparatus according to claim 1, wherein said adding device adds the weight in accordance with a random access performance in the information recording medium.

7. The information recording apparatus according to claim 1, wherein said adding device adds the weight in accordance with a recording speed, which indicates a speed at which the record information is recorded.

8. The information recording apparatus according to claim 1, wherein
the information recording medium comprises a plurality of recording tracks on which the record information is recorded, and
said adding device adds the weight in accordance with a cross-write value which indicates an influence of the laser light on another recording track substantially adjacent to one recording track if the one recording track of the plurality of recording tracks is irradiated with the laser light.

9. The information recording apparatus according to claim 1, further comprising a modifying device for modifying a recording condition in recording the record information, if the record information cannot be recorded with the power in which the at least one reproduction feature with the weight added satisfies the first reference.

10. The information recording apparatus according to claim 9, wherein
the laser light includes a top pulse with a first amplitude and a middle pulse with a second amplitude, which is smaller than the first amplitude, and
said modifying device modifies at least the second amplitude, as the recording condition.

11. The information recording apparatus according to claim 9, wherein
the laser light includes a plurality of pulses, and
said modifying device modifies a pulse width of at least one of the plurality of pulses, as the recording condition.

12. The information recording apparatus according to claim 9, wherein said modifying device modifies at least one of a recording linear velocity and a recording density, as the recording condition.

13. The information recording apparatus according to claim 1, wherein the plurality of reproduction features include at least one of a jitter value, an asymmetry value, an error rate value, a cross-write value, a LPP signal level value, a wobble signal level value, and a CAPA signal level value.

14. The information recording apparatus according to claim 1, wherein said recording device records the record information at a recording speed of N-time speed or more (wherein N is an integer of 2 or more), compared to a reference recording speed in recording the record information.

15. The information recording apparatus according to claim 1, wherein said controlling device controls said recording device to record the record information with the power in which the at least one reproduction feature with the weight added satisfies the predetermined first reference, on the basis of correlation information which indicates a correlation between the power and the at least one reproduction feature with the weight added.

16. The information recording apparatus according to claim 1, wherein said controlling device controls said recording device to record the record information with the power in which the at least one reproduction feature with the weight added satisfies the predetermined first reference, on the basis of correlation information which indicates a correlation between the power and each of the plurality of reproduction features.

17. The information recording apparatus according to claim 16, further comprising a generating device for generating the correlation information by controlling said recording device to record test information for test-writing onto the information recording medium while changing the power and to reproduce the test information.

18. The information recording apparatus according to claim 17, wherein said recording device records the generated correlation information onto the information recording medium.

19. The information recording apparatus according to claim 17, further comprising a storing device for storing therein the generated correlation information.

20. An information recording method in an information recording apparatus comprising: a recording device for recording record information onto an information recording medium by irradiating laser light with a predetermined power, said information recording method comprising:
an adding process of adding weight to at least one of a plurality of reproduction features associated with the record information; and
a controlling process of controlling said recording device to record the record information with a power in which the at least one reproduction feature with the weight added satisfies a predetermined first reference,
wherein said adding process adds a priority order to each of the plurality of reproduction features,
wherein said controlling process controls said recording device to record the record information with a power in which a first reproduction feature with the relatively high priority order out of the plurality of reproduction features satisfies the first reference and in which at least one another reproduction feature other than the first reproduction feature out of the plurality of reproduction features satisfies a second reference, which is milder than the first reference, and wherein in a condition where said controlling process cannot control said recording device to record the record information with the power in which the another reproduction feature satisfies the second reference, said controlling process controls said recording device to record the record information with a power in which a second reproduction feature, which is prioritized next to the first reproduction feature, satisfies the first reference and in which another reproduction feature other than the second reproduction feature out of the plurality of reproduction features satisfies the second reference.

21. A computer program product in a computer-readable medium for tangibly embodying a program of instructions executable by a computer provided for the information recording apparatus according to claim 1, said computer program making the computer function as at least one portion of said recording device, said adding device, and said controlling device.

* * * * *